US006283813B1

(12) United States Patent
Kaneko et al.

(10) Patent No.: US 6,283,813 B1
(45) Date of Patent: Sep. 4, 2001

(54) IMAGE FORMING APPARATUS AND A METHOD FOR MANUFACTURING THE SAME

(75) Inventors: Tetsuya Kaneko; Mitsutoshi Hasegawa, both of Yokohama; Yoshihiro Yanagisawa, Fujisawa; Miki Tamura, Isehara; Kazuhiro Sando, Atsugi; Noriaki Ohguri, Zama; Toru Sugeno, Kawasaki; Osamu Takamatsu, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,553

(22) Filed: May 19, 2000

Related U.S. Application Data

(62) Division of application No. 09/174,003, filed on Oct. 16, 1998, now Pat. No. 6,137,218, which is a division of application No. 08/578,959, filed on Dec. 27, 1995, now Pat. No. 5,831,387, and a continuation-in-part of application No. 08/446,252, filed on May 22, 1995, now abandoned.

(30) Foreign Application Priority Data

| May 20, 1994 | (JP) | 6-106673 |
| May 24, 1994 | (JP) | 6-109401 |
| Dec. 27, 1994 | (JP) | 6-324338 |
| May 15, 1995 | (JP) | 7-115803 |

(51) Int. Cl.$^7$ ............................................. H01J 9/02
(52) U.S. Cl. .................................................. 445/24
(58) Field of Search ......................................... 445/24

(56) References Cited

U.S. PATENT DOCUMENTS

| 4,369,220 | * | 1/1983 | Prabhu et al. ...................... 174/68.5 |
| 5,015,912 |   | 5/1991 | Spindt et al. ......................... 313/495 |
| 5,066,883 |   | 11/1991 | Yoshioka et al. .................... 313/309 |
| 5,216,324 |   | 6/1993 | Curtin et al. ......................... 313/495 |
| 5,219,310 |   | 6/1993 | Tomo et al. ............................. 445/24 |
| 5,256,936 |   | 10/1993 | Itoh et al. ............................. 313/495 |
| 5,315,206 |   | 5/1994 | Yoshida ........................... 313/309 X |
| 5,461,202 |   | 10/1995 | Sera et al. ......................... 714/256 X |
| 5,578,897 |   | 11/1996 | Nomura et al. ....................... 313/310 |
| 5,594,296 |   | 1/1997 | Mitsutake et al. ................... 313/309 |
| 5,654,607 |   | 8/1997 | Yamaguchi et al. ................. 313/495 |
| 5,659,329 | * | 8/1997 | Yamanobe et al. .................. 313/309 |
| 5,831,387 |   | 11/1998 | Kaneko et al. ....................... 313/495 |

FOREIGN PATENT DOCUMENTS

| 0299461 | 1/1989 | (EP) . |
| 0312007 | 4/1989 | (EP) . |
| 0 354 750 | 2/1990 | (EP) . |
| 605881 | * 7/1994 | (EP) . |
| 0 605 881 | 7/1994 | (EP) . |
| 0660359 | 6/1995 | (EP) . |
| 01 112631 | 5/1989 | (JP) . |
| 01 279557 | 11/1989 | (JP) . |
| 03-142894 | 6/1991 | (JP) . |

* cited by examiner

Primary Examiner—Kenneth J. Ramsey
(74) Attorney, Agent, or Firm—Fitzpatrick, Cella, Harper & Scinto

(57) ABSTRACT

An image forming apparatus, according to the present invention, comprises a first substrate whereon are provided a functional element and electric wiring that is connected to the functional element, and a second substrate whereon is an area where an image is to be formed, and wherein, with the first substrate and the second substrate being located opposite to each other, space between the first substrate and the second substrate is kept in a pressure-reduced state so as to form an image in the area on the second substrate, and wherein the electric wiring is formed of a laminated conductive material by a process that plates a printed pattern, which is initially deposited by a printing process.

11 Claims, 24 Drawing Sheets

IMAGE FORMING APPARATUS AND A METHOD FOR MANUFACTURING THE SAME

This is a division of application Ser. No. 09/174,003, filed Oct. 16, 1998 now U.S. Pat No. 6,137,218, which is a division of application Ser. No. 08/578,959, filed Dec. 27, 1995, now U.S. Pat. No. 5,831,387; and a continuation-in-part application of U.S. patent application Ser. No. 08/446,252 filed May 22, 1995, now abandoned.

BACKGROUND OF THE INVENTION

1. Field of the Invention

The present invention relates to an image forming apparatus that has a large size display screen and to a method for manufacturing such an image forming apparatus. More specifically, the present invention relates to an image forming apparatus that is designed by arranging a circuit board where electric wiring is provided in a so-called vacuum container, in which pressure is substantially reduced, and a method for manufacturing such an image forming apparatus.

2. Related Background Art

Recently, a light, thin image forming apparatus, a so-called flat display, is attracting attention as the replacement for a large, heavy Braun tube. As such a flat display unit, a liquid crystal display has been enthusiastically studied and developed; there are, however, problems remaining for the liquid crystal display that an image is dark and an angle for field of view is narrow. As a replacement for the liquid crystal display there is a self-emitting flat display, i.e., a plasma display panel (PDP), a fluorescent display tube (VFD), or a multi-electronic source flat type display panel.

When compared with a liquid crystal display, a self-emitting flat display provides a brighter image and a larger field of view angle. However, since such a flat display is so designed that a substrate where functional components and electric wiring are provided is arranged in a so-called vacuum container, in which air pressure is substantially reduced, a technique is required that can provide a stable performance for the flat display for an extended time of a period. When the wiring for an electronic circuit is to be produced, generally a thin film is formed on a workpiece, such as a substrate, and patterning is performed on the resultant structure. For example, with such one method that is employed, after an Al material has been deposited on the substrate, a wiring pattern is formed for photolithography and etching. Since the procedures of photolithopraphy and etching are complex, a method for forming a wiring pattern without using those procedures is disclosed in Japanese Patent Application Laid-Open No. 3-142894. With the disclosed method, printing is performed directly on a substrate by using an organic metal ink to describe a pattern, followed by electrolytic metal plating of the pattern to provide a metal film of 0.5 to 3 μm. According to the method disclosed in this application, close adhesion of a fine pattern is increased and a sheet resistance of the fine pattern is reduced. While in the publication an explanation is given for the application of the method for a printer head, an image sensor, and a hybrid IC, there is no description for its application for a self-emitting flat display that is so designed that a substrate, whereon functional components and electric wiring are provided, is arranged in the above described vacuum container.

As a self-emitting flat display, a flat image forming apparatus that employs a multi-electronic source to cause a phosphor to become luminescent will now be described.

Conventionally a surface conductive emitter, which is described in a report by M. I. Elinson, Radio Eng. Electron Phys., 10 (1965), is known as an element with a simple structure that can emit electrons. This emitter employs a phenomenon whereby the emission of electrons occurs when, in parallel to the film face, a current is supplied to a thin film that is deposited on a substrate and that has a small dimension.

Reported as such surface conductive emitters are an element with $SnO_2$ thin film deposited, as in the report by Elinson, an element with Au thin film deposited (G. Dittmer, Thin Solid Films, 9, 317 (1972)), an element with $In_2O_3$/$SnO_2$ thin film deposited (M. Hartwell and C. G. Fonstad, IEEE Trans. ED Conf., 519 (1975)), and an element with carbon thin film deposited (Araki et al., Vacuum, Vol. 26, No. 1, p. 22 (1983)).

The arrangement of the above Hartwell element is illustrated in FIG. 15 as one specific arrangement of such a surface conductive emitter. In FIG. 15, reference number 101 denotes an insulating substrate, and 102, a thin film for forming an electron emission portion, which is, for example, a H-shaped metal oxide thin film that is deposited by sputtering. Conductive processing called forming, which will be described later, forms an electron emission portion 103.

Conventionally, according to the general method for making a surface conductive emitter, before the emission of electrons, conductive processing called forming is performed in advance on the thin film 102 to form an electron emission portion, and the electron emission portion 103 is formed. More specifically, the forming is a process during which a voltage is applied to both ends of the thin film 102 to cause local damage, deformation, or deterioration of the thin film 102, and the electron emission portion 103 that has a high resistance to electricity is provided. In the electron emission portion 103, part of the thin film 102 is fractured and electrons are emitted in the vicinity of the fractured area.

Disclosed in U.S. Pat. No. 5,066,883 is an innovative surface conductive emitter where between the element electrodes are dispersed and located particles that permit the emission of electrons. This electron emitter can control the positioning of electron emission portions more accurately than the conventional surface conductive emitters, making it possible for electron emitters to be arranged more accurately. A specific arrangement for such a surface conductive emitter is shown in FIG. 16. In FIG. 16, reference number 201 denotes an insulating substrate; 202 and 203, element electrodes for electric connection; and 204, a thin film that is made of an electron emission particle material that is dispersed and positioned.

For the surface conductive emitter, an appropriate electrode interval between the paired electrodes 202 and 203 is 0.01 micron to 100 microns, and an appropriate a sheet resistance for the electron emission portion in the thin film 204 is $1 \times 10^3$ Ω/□ to $1 \times 10^9$ Ω/□.

When the above described surface conductive emitter is employed as a flat display, it must be located in a vacuum container because an electron beam is irradiated. In the vacuum container, a face plate is positioned above and almost perpendicularly to the emitter to provide an electron emitting device. When a voltage is applied between the electrodes, a phosphor is irradiated by an electron beam, which is acquired from the electron emission portion, in order to cause the phosphor to become luminescent, making it possible for the emitter to be used as a flat display device.

When the screen size of the above described flat display device has been increased, however, the following shortcomings have arisen. Specifically, for manufacturing a thus structured surface conductive emitter, a functional thin film is deposited on a workpiece and patterning is performed on the resultant structure. When the photolithographic technique is employed to produce a fine pattern on a large substrate that is, for example, 40 cm square or larger, a large manufacturing apparatus that includes an aligner is required and the manufacturing costs are enormous.

Further, unlike an aligner that is employed for silicon semiconductors, it is difficult for an aligner that handles large substrates to set a pattern processing size to 4 microns or smaller because of optical limits and because a shorter processing time is required for each substrate. The production of a display device that requires much finer patterns is difficult.

In addition, for a large substrate of about one meter square, it is difficult to increase the size of the manufacturing device itself. Even if a large device that can be used for exposing could be provided, the processing for each substrate would take longer and the manufacturing costs would be greatly increased.

As other methods for processing an electronic circuit, there may be employed a screen printing method, or a method where pattern printing is performed by using a conductive paste or an insulating paste and then annealing the resultant structure to form an electrode wiring pattern and an insulation layer. The patterning that involves the use of a printing method can be employed for comparatively large substrates, and the processing time that is required for each substrate is shorter than that which is required for the photolithographic technique.

However, a printed pattern tends to be deformed due to the flowability of resist ink, of a conductive paste or of an insulating paste, the generation of blank areas and the poor transfer of a print pattern, and the pressure exerted by a print pattern. Therefore, delicate control of a pattern meter and skill are required to maintain the high accuracy in the size of pattern. When wiring is formed by printing, that wiring is comparatively inferior in its density. When the surface is enlarged and examined, it is found to be comparatively porous. When such wiring that has inferior density is to be applied to the above described self-emitting flat display, since the circuit substrate with such wiring is positioned in a vacuum container, there are problems, such as the adsorption of gas or the discharge of gas by wiring that has less density, the change in the degree of vacuum due to the gas discharge, and the deterioration of the display performance.

Further, to increase the size of the display screen of a flat image-forming apparatus, the length of the drive wiring that is arranged in the screen is extended, and in consonance with the length of the wiring, wiring resistance is increased between a wiring electrode end, to which a voltage is applied, and a wiring electrode end that is opposite it.

The following problems may occur, depending on the amount of increase in wiring resistance:

1) A voltage drop relative to the applied voltage occurs, and accordingly, voltages that are applied between the connected elements are different at both ends of wiring are different, so that a difference in the display luminescence is incurred and an uneven image tends to be produced. 2) A time lag occurs between transmitted element drive signals, and the time when a drive signal is provided at the connected elements varies at both ends of wiring. Therefore, for image displaying on a large screen, the period of time for the display of one screen frame is extended and a displayed image is unnatural and is not visually smooth.

Thus, the reduction of wiring resistance must also be considered.

Additionally, wiring formed by printing has a resistivity higher than that of wiring formed by photolithography, so the wiring must be made thick for a large size flat image forming apparatus. For this reason, the wiring must be arranged in consideration of the influence on the traveling process of electrons emitted from the electron emitter.

SUMMARY OF THE INVENTION

It is one object of the present invention to provide an image forming apparatus that removes the above described technical shortcomings and a method for manufacturing the image forming apparatus.

It is another object of the present invention to provide an image forming apparatus that restricts the discharge of gas from printed wiring whose density is inferior so as to prevent the deterioration of display performance, and a method for manufacturing the image forming apparatus.

It is an additional object of the present invention to provide an image forming apparatus that can reduce resistance in wiring and a method for manufacturing the image forming apparatus.

It is still another object of the present invention to provide an image forming apparatus that can reduce the influence on the traveling process of electrons emitted from an electron emitter having wiring formed by printing.

An image forming apparatus according to the present invention is as described below.

An image forming apparatus, according to a first embodiment the present invention, comprises:

a first substrate whereon are provided a functional element and electric wiring that is connected to the functional element, and a second substrate whereon is an area where an image is to be formed, and wherein, with the first substrate and the second substrate being located opposite to each other, space between the first substrate and the second substrate is kept in a pressure-reduced state so as to form an image in the area on the second substrate, and wherein the electric wiring is formed of a laminated conductive material by a process that plates a printed pattern, which is initially deposited by a printing process.

According to the second aspect of the present invention, there is provided an image forming apparatus in which a first substrate having a plurality of electron emitters each having an electron emission portion between a pair of electrodes and arranged in a matrix, first wiring for commonly connecting first electrodes of the pairs of electrodes, and second wiring formed above the first wiring though an insulating layer to be substantially perpendicular to the first wiring to commonly connect second electrodes of the pairs of electrodes, and a second substrate whereon is an area where an image is to be formed are located opposite to each other, and electrons emitted from the electron emission portion are irradiated on the region where the image is to be formed, thereby forming the image, wherein the first wiring, the insulating layer, and the second wiring are formed by printing, and the second wiring is arranged to be substantially parallel to a direction for connecting the pair of electrodes to each other.

A method for manufacturing the image forming apparatus according to the present invention is as follows.

According to the present invention, a method for manufacturing an image forming apparatus, which comprises a first substrate whereon are provided a functional element and electric wiring that is connected to the functional element and a second substrate whereon is an area where an image is formed, and wherein, with the first substrate and the second substrate being located opposite to each other, space between the first substrate and the second substrate is kept in a pressure-reduced state so as to form an image in the area on the second substrate, comprises the steps of:

forming a printed pattern with a printing process; and forming the electric wiring by employing a plating process to deposit laminate of a conductive material on the printed pattern.

With the image forming apparatus and the manufacturing method of the present invention, the above described technical shortcomings can be resolved and the above objects can be achieved.

According to the image forming apparatus of the first embodiment of the present invention, the adsorption of gas by, or the discharge of gas from wiring that has inferior density can be held at zero, or be reduced considerably low. Thus, changes in the degree of vacuum in the vacuum container that constitutes the image forming apparatus can be limited to considerably small values.

In addition, since the wiring resistance is low, an excellent display image condition can be stably formed for an extended period of time.

According to the image forming apparatus of the second aspect of the present invention, the wiring layers are arranged in consideration of the traveling process of electrons emitted from the electron emitter. For this reason, the electrons can be prevented from striking against the wiring not to reach the second substrate. More specifically, wiring formed by printing has a resistivity higher than that of wiring formed by photolithography, so the wiring to be used for an image forming apparatus must be made thick. Electrons emitted from the electron emitter tend to take an orbit shifting in a direction for connecting the pair of electrodes. The second wiring is formed above the first wiring through the insulating layer so that the second wiring is present at a position higher than that of the first wiring. Therefore, the electrons may strike against the second wiring. However, according to the image forming apparatus of the second aspect of the present invention, the second wiring is arranged to be substantially parallel to a direction for connecting the pair of electrodes. For this reason, even if the electrons take a shifting orbit, the electrons are unlikely to strike against the second wiring. With this arrangement, a stable display image can be obtained in the image forming apparatus of the second aspect as well.

By employing the method for manufacturing an image forming apparatus of the present invention, stable, low-cost manufacturing of image forming apparatuses that have a large display screen is possible.

BRIEF DESCRIPTION OF THE DRAWINGS

FIGS.. 1A through 1F are specific diagrams illustrating an electric wiring example that is applied to an image forming apparatus according to the present invention.

DETAILED DESCRIPTION OF THE PREFERRED EMBODIMENTS

An image forming apparatus according to the present invention is arranged as is described above, and a method for manufacturing the image forming apparatus according to the present invention is performed in the above described manner.

The present invention is applied to a self-emitting display that is constituted by using a vacuum container. The present invention will now be explained by employing, as a self-emitting display that employs a vacuum container, an image forming apparatus that employs a multi-electronic source to emit a phosphor and that forms an image.

Figure 4:
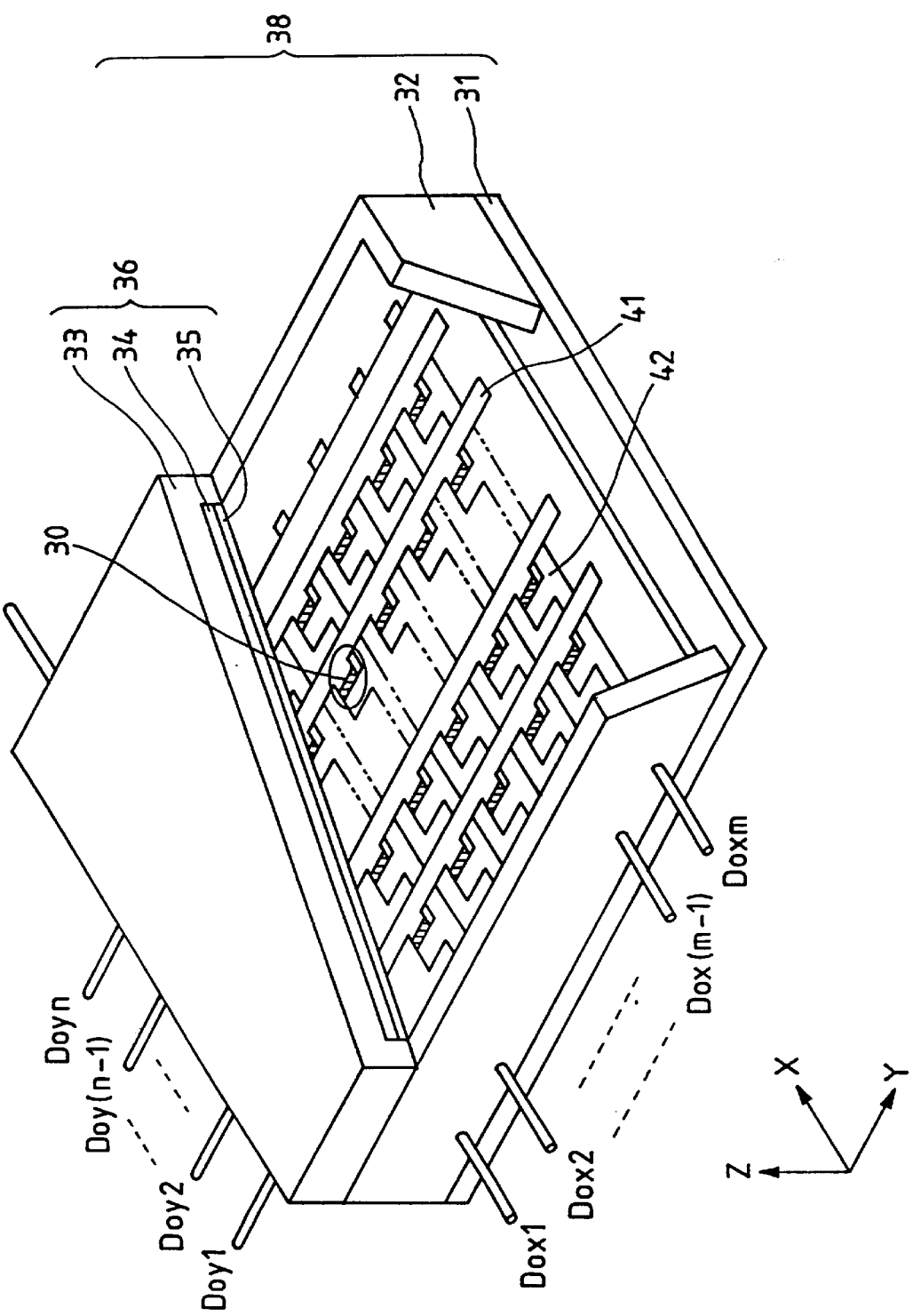
FIG. 4 is a specific diagram illustrating another example of the image forming apparatus of the present invention.

One example of the image forming apparatus according to the first embodiment of the present invention will be described with referring to FIG. 4. FIG. 4 is a specific perspective view of the image forming apparatus. In FIG. 4, an electron emitter 30, which serves as a functional element, is formed on a substrate 31 (hereafter also referred to as a "rear plate") while the electron emitter 30 is connected to electric wiring 41 and electric wiring 42. A substrate 36 (hereafter also referred to as a "face plate") is provided opposite the substrate 31 and has an area whereon an image is to be formed. Space between the substrates 31 and 36 is held in a pressure-reduced condition (a substantial vacuum condition) by an associated support frame 32, and in that condition, images are formed on the substrate 36.

The substrate 36 is produced by forming a fluorescent film 34 and a metal back 35 on the internal face of a glass substrate 33. Electrons that have been emitted by the electron emitter 30 flow to the metal back 35, to which a high voltage has been applied, and when the electrons strike the fluorescent film 34 fluorescence is induced and an image is formed.

More specifically, in the example shown in FIG. 4, via terminals Dox1 through Doxm and Doy1 through Doyn, a voltage is applied to the electron emitter 30, which in turn emits electrons. A high voltage of several kV or higher is applied through a high voltage terminal Hv either to the metal back 35 or to a transparent electrode (not shown) to accelerate an electron beam. When the electronic beam strikes against the fluorescent film 34 and makes the film 34 become fluorescent, an image is displayed. The space between the substrates 31 and 36 can be maintained at a degree of vacuum of $10^{-5}$ torr to $10^{-8}$ torr. The feature of the present invention is that the electric wiring that is connected to the functional element 30 is formed by employing a plating process to deposit laminate of a conductive material on a printed pattern that is deposited by a printing process.

To easily understand the feature of the present invention, an explanation will be given while referring to FIG. 3.

Figure 3:
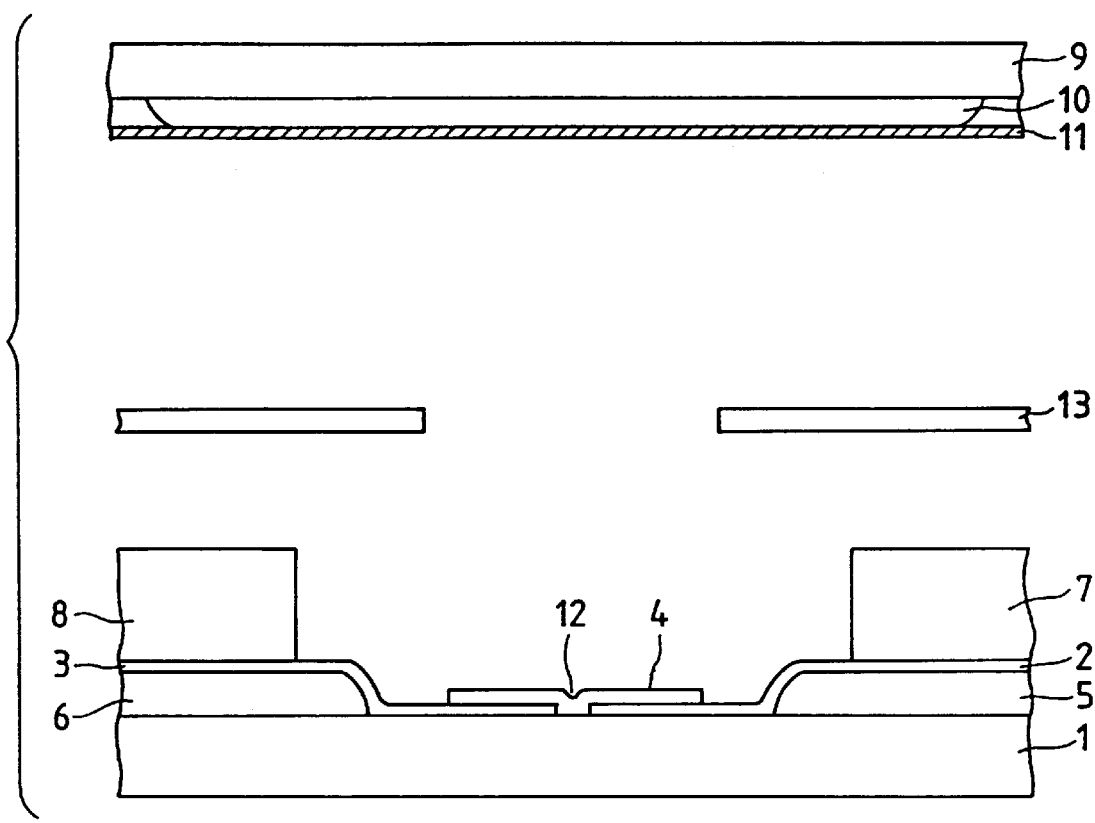
FIG. 3 is a specific diagram illustrating an example of the image forming apparatus of the present invention.

FIG. 3 is a specific diagram illustrating another example of an image forming apparatus that employs a surface conductive electron emitter. In FIG. 3, a substrate 1 is constituted by an insulator, element electrodes 2 and 3 are employed for electric connections, and a thin film 4 is including particles which is dispersed.

In the surface conductive electron emitter, it is preferable that the width of an interval between the paired electrodes 2 and 3 be from several microns to several hundred microns, that their thickness be several hundred Å to several μm, and that the thickness of the thin film 4 be several Å to several thousand Å, preferably several tens of Å to several hundred Å. These dimensions should be set as needed.

Printed wiring 5 and printed wiring 6 are connected respectively to the element electrodes 2 and 3. Usually, the wiring 5 and the wiring 6 need have only a thickness that is acquired by the annealing of print paste ink and that is generally in the range of 1 μm to 100 μm, preferably, 2 μm to 80 μm.

Plated wiring 7 and plated wiring 8 are deposited on the printed wiring 5 and the printed wiring 6, to a thickness that is selected in order to limit an applied drive voltage drop when wiring is provided over a large area and to reduce wiring resistance that is related to signal delay. In general, while taking stress into account, a wiring thickness is set that is from 1 μm to 100 μm. Since, when compared with thin film and plated wiring, the resistance reduction effect that is achieved with plated wiring having a thickness of about 10 microns or greater is substantial, the thickness of the plated wiring is preferably 10 μm to 100 μm.

The face plate is formed by laminating a phosphor 10 and a metal back 11 on a glass substrate 9.

A grid electrode 13, which controls the electron flow, is provided as needed.

One example of the method for manufacturing the above described image forming apparatus will now be described while referring to FIGS. 1A through 2E. FIGS. 1A through 1F concern an electron source substrate, and FIGS. 2A through 2E concern a face plate substrate.

Figure 1A:
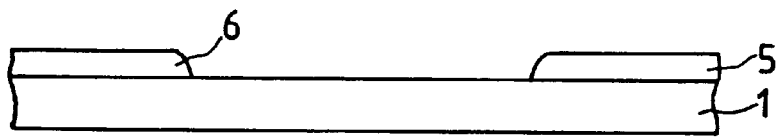

In FIGS. 1A through 1F, by using a screen printing process, conductive paste ink is printed on a substrate 1 that has been well washed, and the resultant structure is annealed to form wiring 5 and wiring 6 (FIG. 1A).

Figure 1B:
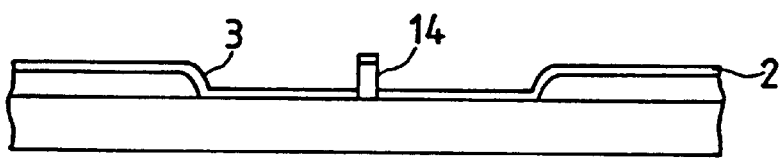
Figure 1C:
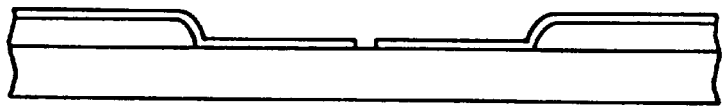

Then, a gap resist 14, which serves as an element electrode gap, is formed between the wiring 5 and the wiring 6 by photolithography, and a conductive film that is composed of an element electrode material is deposited by vacuum deposition. The gap resist 14 is then removed and unnecessary conductive film is lifted off to form element electrodes 2 and 3. In this manner, the element electrodes 2 and 3 are laminated on and electrically connected to the wiring 5 and the wiring 6, respectively (FIGS. 1B and 1C).

Figure 1D:
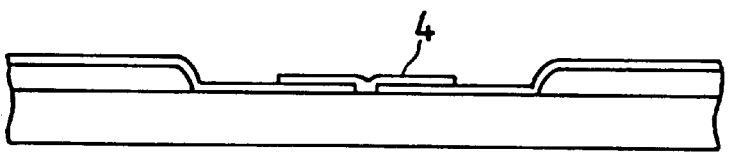

Following this, a thin film 4 that is formed of an electron emitting material is deposited at the electrode gap by reverse etching. The formation of the electron emitting material film is performed by the coating and annealing, the vacuum evaporation, the sputtering, or the chemical vapor deposition of an organic metal compound solution, or by the dispersing, coating and annealing of ultra fine particles that consist of electron emitting material (FIG. 1D).

Figure 1E:
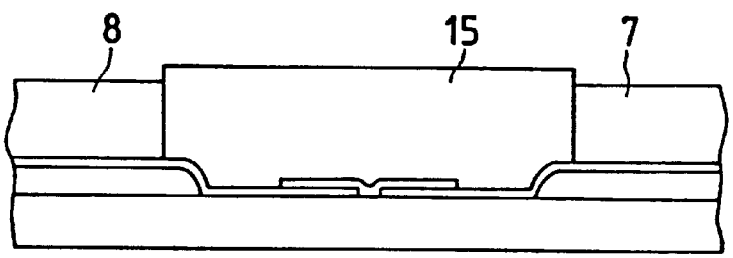

Then, patterning with a plating resist 15 is performed to shield an electron emission portion while leaving uncovered portions of the wiring 5 and the wiring 6. This structure is then immersed in a plating bath to deposit plated wiring 7 and plated wiring 8 on the wiring 5 and the wiring 6 (FIG. 1E). Either an electrolytic plating process or a non-electrolytic plating process, or both, can be employed.

Figure 1F:
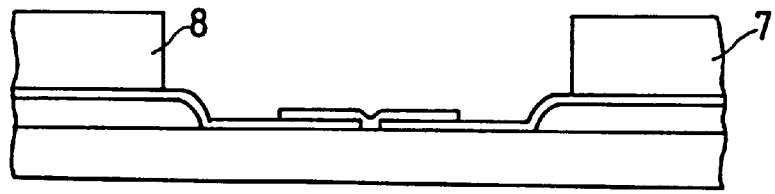

After the plating is completed, the plating resist 15 is removed to acquire an electron source substrate (FIG. 1F). In the present invention, as a conductive material that is formed by the plating process, one of a metal that contains copper as a primary component, a metal that contains nickel as a primary component, a metal that contains chrome as a primary component, a metal that contains gold as a primary component, or a metal that contains silver as a primary component can be selected. Taking into account electric conductivity and cost, a metal that contains copper is recommended.

As the substrate 1, silica glass, glass that contains a reduced amount of impurities such as sodium, soda lime glass, a glass substrate where $SiO_2$ that is formed by sputtering is laminated on soda lime glass, or ceramics such as alumina may be used.

For the element electrodes 5 and 6, any material may be employed as long as it is conductive. For example, there are conductive materials that consist of metals, such as Ni, Cr, Au, Mo, W, Pt, Ti, Al, Cu, and Pd or its alloy, or metals, such as Pd, Ag, Au, $RuO_2$, and Pd—Ag or its metal oxide, and glass; transparent conductive materials such as $In_2O_3$—$SnO_2$; and semiconductor materials, such as polysilicon.

As the material that forms the thin film 4, which includes an electron emission portion, may be employed, for example, a metal such as Pd, Pt, Ru, Ag, Au, Ti, In, Cu, Cr, Fe, Zn, Sn, Ta, W, or Pb; an oxide such as PdO, $SnO_2$, $In_2O_3$, PbO, or $Sb_2O_3$; a boride such as $HfB_2$, $ZrB_2$, $LaB_6$, $YB_4$, or $GdB_4$; a carbide such as TiC, ZrC, HfC, TaC, SiC, or WC; a nitride such as TiN, ZrN, or HfN; a semiconductor such as Si or Ge; carbon; AgMg; NiCu; or PbSn.

A fabrication method for a face plate is illustrated in FIGS. 2A through 2E.

Figure 2A:
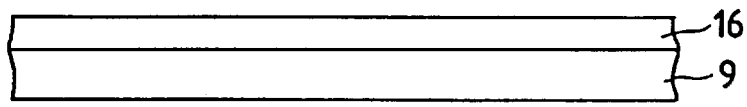
FIGS. 2A through 2E are specific diagrams illustrating a second substrate example in the image forming apparatus according to the present invention.

First, a resin such as PVA (polyvinyl alcohol) and a phosphor slurry 16, to which a photosensitive agent is added to make the slurry 16 photosensitive, are deposited as solids on the glass substrate 9 that has been well washed, and the resultant structure is dried. As the coating method, spinning, dipping, spray coating, roll coating, screen printing, or offset printing is employed (FIG. 2A).

Then, a photomask (not shown) is employed to cover the deposited phosphor slurry 16 and only a necessary portion is exposed to light. During developing, the phosphor slurry 16 at the unneeded portion is removed. The resultant structure is then annealed, and the photosensitive resin is oxidized and burned out to produce the phosphor 10 on which patterning was performed (FIG. 2B).

Figure 2B:
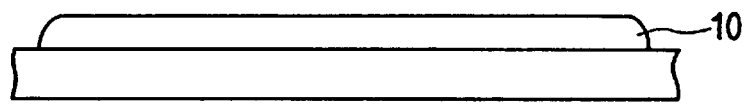

When phosphors for three prime colors, red (R), green (G) and blue (B), are required to provide colors for the display device, the procedures shown in FIGS. 1A and 2B are repeated for each color and patterning is performed to deposit the phosphors on the glass substrate 9 separately.

Figure 2C:
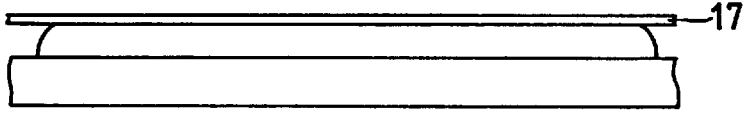

The phosphor 10 is then immersed in a water solution, and a resin thin film, such as a clear lacquer, is developed. Following this, water is eliminated from the solution, a thin resin film 17 is developed and positioned on the phosphor 10, and the resultant structure is dried. This procedure is called filming (FIG. 2C).

Figure 2D:
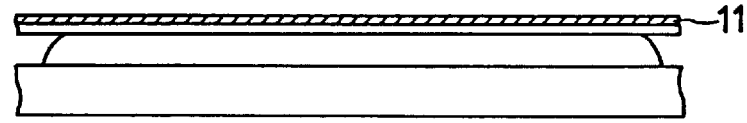

A metal thin film, such as Al, having a thickness of several hundred Å is formed by vacuum deposition on the phosphor on which filming was performed, and is employed as a metal back 11 (FIG. 2D).

Figure 2E:
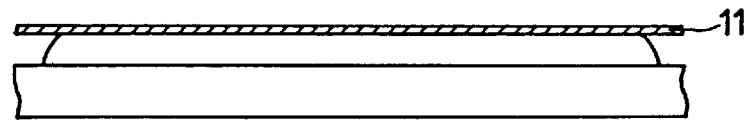

Then, the resin thin film 17 is burnt and removed from the face plate. At this time, the metal back 11 is flattened and positioned as a continuous film on the phosphor 10 (FIG. 2E).

In this example, when multiple electron emitters and phosphors are arranged, the arrangement pitch is determined by the number of pixels and a screen size that are required for an image display device. For example, for a screen that is 40 cm long and that has a resolution of 560 scan lines, the pitch per pixel is about 720 microns. Further, for colors, a single pixel must be split so as to provide three prime colors, R, G, and B. If it is evenly split into three parts, the pitch is 240 microns.

In this case, the phosphor that corresponds to the electron emission portion can be positioned with a one to one correspondence.

In this example, the electron emission portion is accurately located on the substrate 1 by the element electrodes, which were provided by photolithography. The phosphor 10 that corresponds to the electron emission portion is also accurately located on the glass substrate 9 by photolithography.

The accuracy in positioning a pattern with photolithography is generally high. Although the accuracy varies depending on the specifications for a mask exposure device, a positioning accuracy error that does not exceed 4 microns can be obtained when positioning a pattern in a 40 cm square printing area. If this positioning error is large, for example, if the position is shifted by 40 μm relative to a pixel pitch of about 240 μm, an adjacent phosphor will be irradiated by electrons, which are emitted from the electron emission portion, in a range of about one sixth the size of the pixel pitch. In this manner, crosstalk will occur at a luminance point.

In this example, wiring patterning is performed by screen printing that can cope comparatively well with an increase in the size of a printing area. With screen printing, generally, the position of paste ink after patterning is shifted relative to the position of a print because a screen mesh mask, which serves as a print pattern, is pressed down and slid, together with the paste ink, by a rubber spatula called a squeegee. Although the printing condition affects the positioning difference, in many cases, a positioning difference of about 40 microns occurs locally relative to a printing area of 40 cm square. In this example, however, a pattern positioning difference due to screen printing does not directly relate to crosstalk that occurs because the position of the electron emission portion and the position of the phosphor center are shifted. More specifically, as long as the electron emission portion is formed at an exact position by photolithography, and the element electrodes are connected to the wiring, a positioning difference for the wiring, on which patterning is performed by the screen printing, does not directly affect the crosstalk at the luminance point. Therefore, a large margin at the connection of the element electrodes and the wiring may be designed by taking into account the distance the wiring position is shifted.

The plating process employed in this example can easily provide thick film wiring that has low resistivity. Although depending on a plating method for a film and conditions, the acquired film can have resistivity almost the same as a bulk value of metal and can have a thickness of several microns to 100 microns, so that wiring having a very low resistance can be provided. In a display device with a large screen, it is possible to reduce the voltage drop at an electron emitter that is caused by wiring resistance and to limit the time drive signals are delayed.

According to the present invention, the shape of an insulating layer is designed and plated wiring is formed to facilitate the electrical connection of element electrodes to wiring.

Such an example will be explained below.

As one example, there is a circuit board, which comprises lower wiring that is formed on an insulating substrate, upper wiring that is formed perpendicular to the lower wiring, with the insulating layer in between, so that it is insulated from the lower wiring by the insulating layer, and an electron emitter that is constituted by element electrodes, which are two electrodes that are formed opposite to each other, and a thin film, which contains an electron emitting material, whereupon (a) one of the two element electrodes that are opposite to each other is connected to the lower wiring, and the other electrode is connected to a connection line that is discontinuously formed on the substrate, (b) the insulating layer is deposited perpendicular to the lower wiring, and the width of the insulating layer is larger at the intersection with the lower wiring than at the intersection with the connection line, (c) the upper wiring is formed on the insulating layer perpendicular to the lower wiring so as to have a smaller width at the intersection with the lower wiring than that of the insulating layer, and is insulated from the lower wiring, and (d) a lamina of plated wiring is deposited that has a greater width than that of the upper wiring and a smaller width at the intersection with the lower wiring than does the insulating layer, and the upper wiring is electrically connected to the connection line via the plated wiring.

This circuit board will now be described while referring to FIGS. 9A through 9C and 10A through 10F.

Figure 9A:
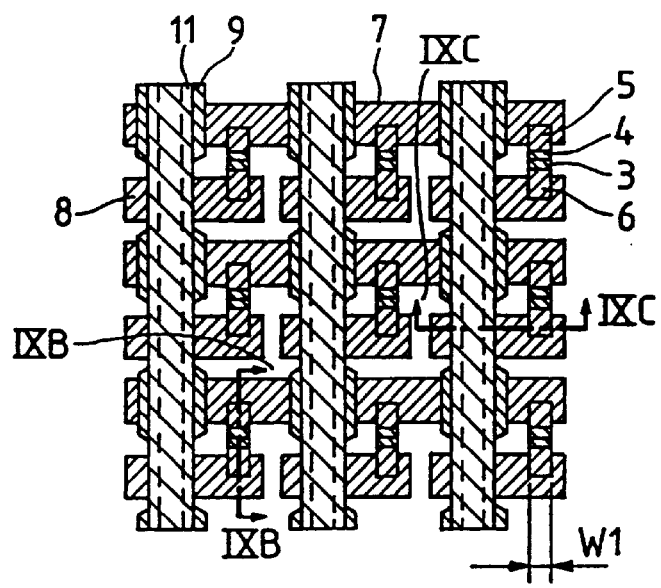
FIGS. 9A through 9C are specific diagrams illustrating still one more electric wiring example that can be applied to the present invention.
Figure 9B:
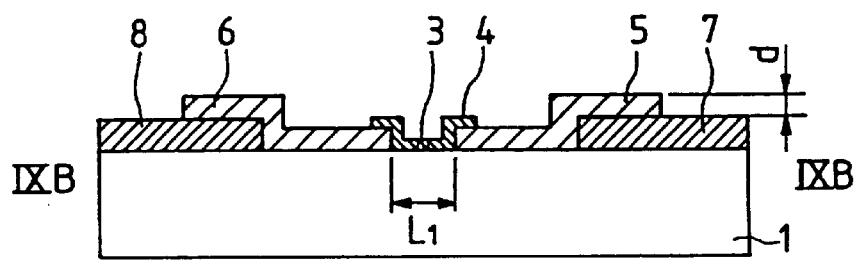
Figure 9C:
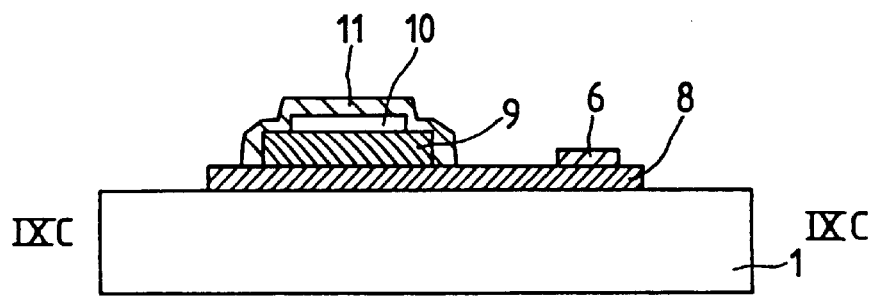

FIG. 9A is a plan view of a partial arrangement of the circuit board; FIG. 9B is a cross sectional view taken along the line IXB—IXB; and FIG. 9C is a cross sectional view taken along the line IXC—IXC. In FIGS. 9A through 9C, reference number 1 denotes an insulating substrate; 5 and 6, element electrodes; 2, a thin film for forming an electron emission portion; 3, an electron emission portion; 4, a thin film that includes the electron emission portion 3; 7, lower wiring; 9, an insulating layer; 10, upper wiring; 8, a connection line to electrically connect the upper wiring 10 and the element electrode 5; and 11, plated wiring.

In this circuit board example, distance L1 between the element electrodes 5 and 6 is several microns to several hundred microns. Although the electrode distance L1 is determined by a voltage that is to be applied to the electrodes and an electric field strength with which electrons can be emitted, it is preferably several $\mu$m to several tens of $\mu$m. The length W1 of the element electrode is several $\mu$m to several hundred $\mu$m, and film thickness d of the element electrodes 5 and 6 is several hundred Å to several $\mu$m.

The thin film 4 that includes the electron emission portion 3 is formed between, and partly on, the element electrodes 5 and 6. Its thickness is several Å to several thousand Å, preferably several tens of Å to several hundred Å. This value is determined as needed by step coverage of the element electrodes 5 and 6, resistances of the electron emission portion 3 and the element electrodes 5 and 6 and the diameter of conductive particles of the electron emission portion 3, conductive processing conditions, etc.

The lower wiring 7 and the connection line 8 are wiring that is formed on the insulating substrate 1 and that are several $\mu$m to several tens of $\mu$m. The lower wiring 7 is electrically connected to the element electrode 5.

The insulating layer 9 is deposited perpendicular to the lower wiring 7, and the upper wiring 10 lies over it. The width of the insulating layer 9 is greater at the intersection with the lower wiring 7, and is smaller at the intersection with the connection line 8. The thickness of the insulating layer 9 is several $\mu$m to several tens of $\mu$m. The thickness of the upper wiring 10 is several $\mu$m to several tens of $\mu$m.

The plated wiring 11 is formed on the upper wiring 10, and with the plated wiring 11, the upper wiring 10, the connection line 8, and the element electrode 6 are electrically connected. Since the insulating layer 9 is formed with a sufficient width at the intersection of the lower wiring 7 and the upper wiring 10, the lower wiring 7 is electrically insulated from the upper wiring 10 and the plated wiring 11. The plated wiring 11 connects the upper wiring 10 to the connection line 8. When wiring is to be provided on a large area, in order to reduce wiring resistance that induces a voltage drop of the applied drive voltage and that causes signal delays, an appropriate thickness for the plated wiring 11 is selected as needed. The thickness is generally several tens of $\mu$m to several hundred $\mu$m.

A method for fabricating this circuit board example will be explained while referring to FIGS. 10A through 10F.

Figure 10A:
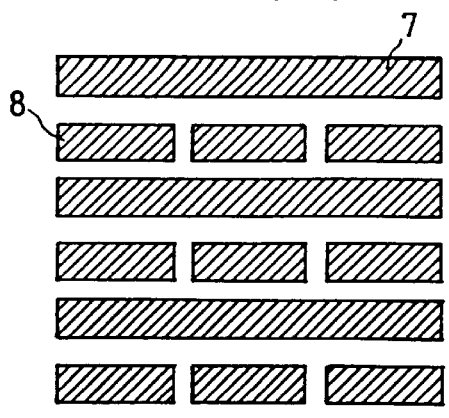
FIGS. 10A through 10F are specific diagrams illustrating still another electric wiring example that can be applied to the present invention.

1) The insulating substrate 1 is washed well with a detergent, pure water, and an organic solvent, and a conductive paste is printed on it by a printing process. The resultant substrate 1 is then annealed to form the lower wiring 7 and the connection line 8 (FIG. 10A). A screen process, for example, is employed as the printing process.

Figure 10B:
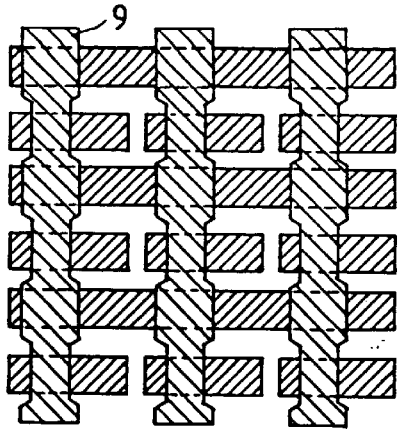

2) An insulating paste is printed, by a printing process, on the substrate 1 perpendicular to the lower wiring 7. The resultant structure is then annealed to form the insulating layer 9, as is shown in FIG. 10B. The width of the insulating layer 9 is greater at the intersection with the lower wiring 7 and is smaller at the intersection with the connection line 8.

Figure 10C:
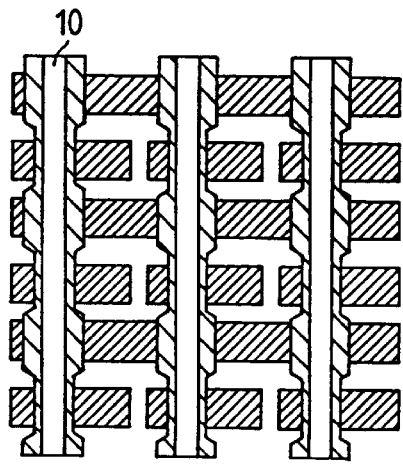

3) A conductive paste is printed on the insulating layer 9 by a printing process, and the structure is then annealed to provide the upper wiring 10 (FIG. 10C). Although, in FIG. 10C, the upper wiring 10 is formed so as to be narrower than the insulating layer 9, the width of the upper wiring 10 may be greater than that of the insulating layer 9 at the intersection with the lower wiring 7 and may be smaller than that of the insulating layer 9 at the intersection with the connection line 8.

Figure 10D:
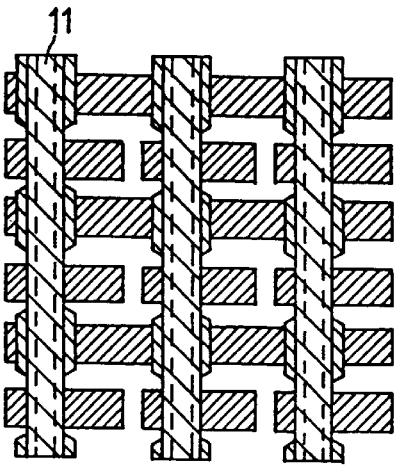

4) The resultant substrate is then immersed in a plating bath, and the plated wiring 11 is deposited on the upper wiring 10, which is employed as an electrode. The plated wiring 11 is extended from the top and the side of the upper wiring 10 until it reaches the connection line 8. As the plating is continued, the plated wiring 11 is also formed on the connection line 8. When plating is performed while a current that flows between the upper wiring 10 and the connection line 8 is monitored, conductance can be confirmed (FIG. 10D).

5) A conductive thin film is deposited by vacuum evaporation, sputtering, etc., and on it a photoresist that has a predetermined shape is formed by photolithography. By employing the photoresist as a mask, etching is performed on the conductive thin film and thus the element electrodes 5 and 6 are thus provided.

Figure 10E:
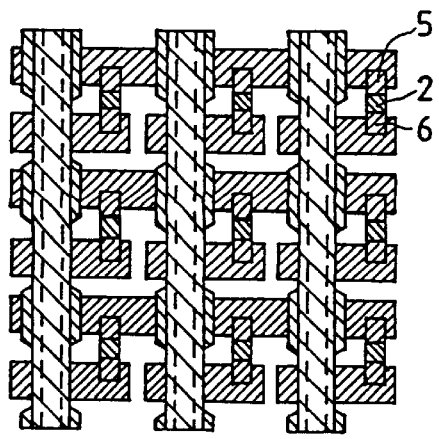

Then, photolithography and a lift-off method are employed to deposit the thin film 2 for the forming of an electron emission portion. Vacuum evaporation, sputtering, chemical vapor deposition, coating and annealing of an organic metal compound solution, or the dispersing, coating, and annealing of ultra fine particles is employed for the formation of the thin film 2 (FIG. 10E). The deposition of the element electrodes 5 and 6 and the thin film 2 for forming an electron emission portion may be performed either before or after the plated wiring formation procedure.

Figure 10F:
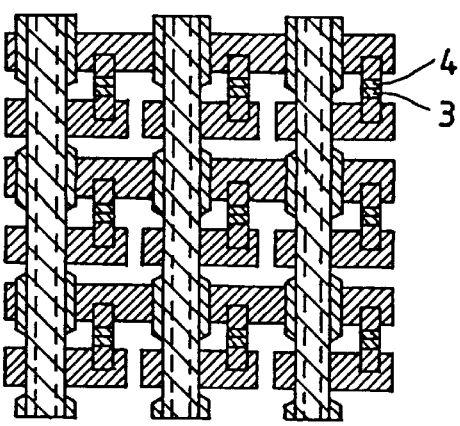

6) Sequentially, a forming process is performed by applying, from a power source (not shown), a pulse voltage or a high-speed booster voltage to the element electrodes 5 and 6. Then, when a part of the structure of the thin film 2 is changed and the electron emission portion 3 is thereby formed to provide an electron emitter, the circuit board example is acquired (FIG. 10F). The electron emission portion 3 including conductive particles having a diameter of several Å to several thousand Å, preferably, 10 Å to 200 Å. This value for the electron emission portion 3 depends on the fabrication processing, such as the processing for the thickness of the thin film 4, which includes the electron emission portion 3, and the forming process conditions, and is determined as needed. The material for the electron emission portion 3 is the same as part, or all, of the elements of the material for the thin film 4 that includes the electron emission portion.

An image forming apparatus according to the second embodiment of the present invention will be described below. The image forming apparatus according to the second embodiment of the present invention has the arrangement as described above. That is, the second embodiment has a wiring arrangement considering the traveling process of electrons emitted from an electron emitter.

Electrons emitted from an electron emission portion tend to take an orbit shifting to a direction for connecting a pair of electrodes. However, when second wiring is arranged to be substantially parallel to the direction for connecting the pair of electrodes, the electrons are unlikely to strike against the second wiring even if they take the shifting orbit.

Figure 17:
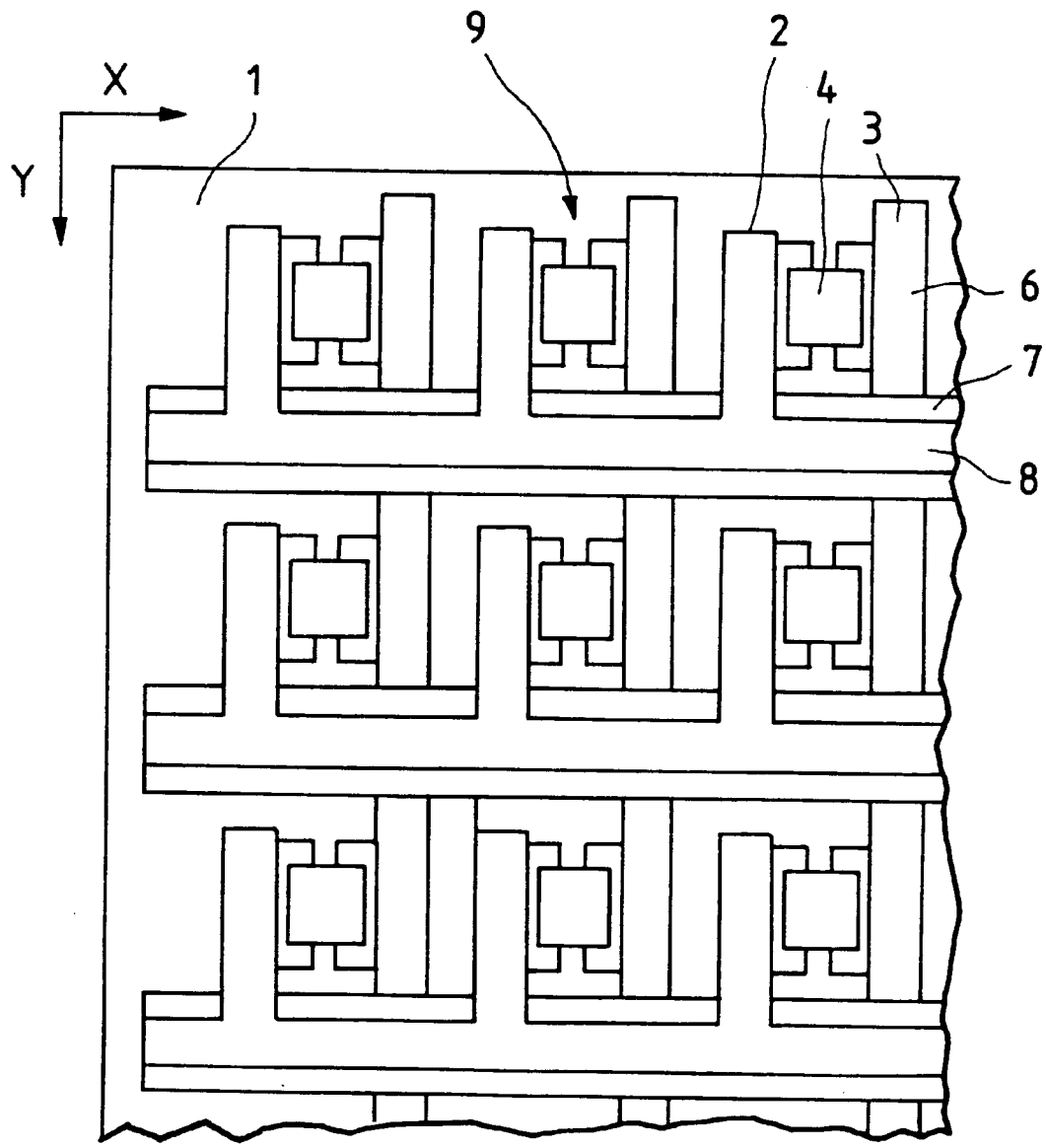
FIG. 17 is a plan view showing the main part of an electron source.

A description will be made with reference to FIG. 17. In FIG. 17, a conductive thin film 4 in which an electron emission portion is formed is provided between electrodes 2 and 3. First wiring 6 commonly connects the electrodes 3 to each other. Second wiring 8 commonly connects the electrodes 2 to each other. An insulating interlayer 7 maintains the insulated state between the wiring layers 6 and 8. The electron emission portion of an electron emitter 9 is formed in the conductive thin film between the electrodes 2 and 3. Electrons emitted from the electron emission portion take an orbit shifting to a direction for connecting the electrodes 2 and 3 depending on a voltage applied to the element electrodes 2 and 3. However, in this embodiment, the second wiring layer 8 on the insulating layer 7 is arranged to be parallel to the direction for connecting the electrodes 2 and 3 although it is present at a position higher than that of the first wiring layer. For this reason, the electrons are unlikely to strike against the second wiring layer 8. The process for manufacturing the electron source shown in FIG. 17 will be described.

Figure 18:
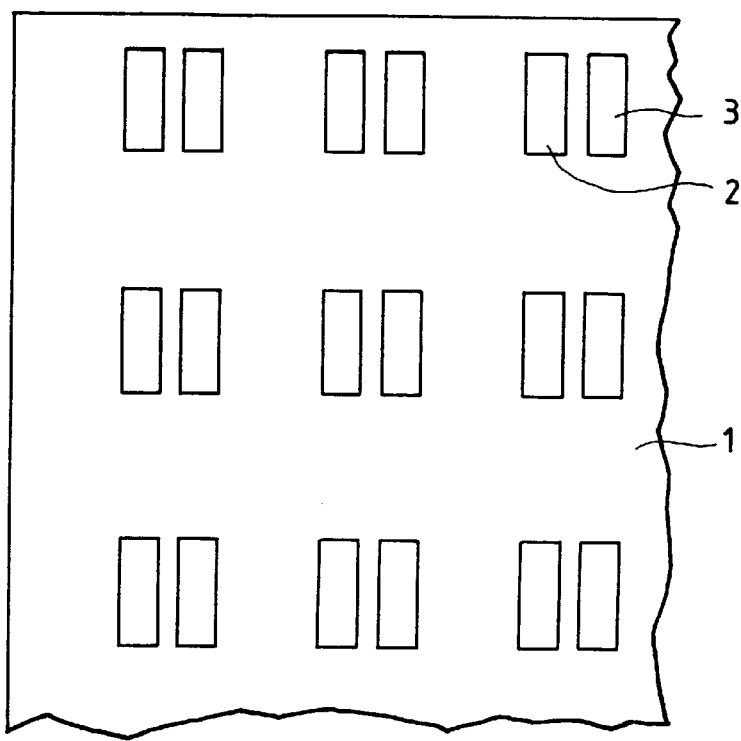
FIG. 18 is a view for explaining the process for manufacturing the electron source, in which element electrodes are formed.

As shown in FIG. 18, printing and annealing of a substrate 1 which has been washed well are performed to form the element electrodes 2 and 3. Normally, the conductive thin film 4 for forming the electron emission portion is much thinner than the wiring layers 6 and 8. Therefore, the element electrodes 2 and 3 are provided to avoid problems of wettability and step maintenance and obtain satisfactory electrical connection between the conductive thin film 4 for forming the electron emission portion and the wiring layers 6 and 8.

To form the element electrodes 2 and 3, a method using a vacuum system such as vacuum deposition, sputtering, and plasma CVD, or a thick film forming method wherein a thick film paste consisting of a metal component and a glass component mixed with a solvent is printed and annealed can be used. To reduce the manufacturing steps, the thick film process which does not require photolithography can be used to form the element electrodes 2 and 3. However, the film thickness is preferably thin near the electron emission portion where electrons are emitted, i.e., near the conductive thin film 4. Therefore, in use of the thick film process, a so-called MOD paste consisting of an organic metal compound is preferably used as a paste. Another film forming process can be used, as a matter of course. In addition, the material of the element electrodes 2 and 3 is not limited as far as it has an electrical conductivity.

Figure 19:
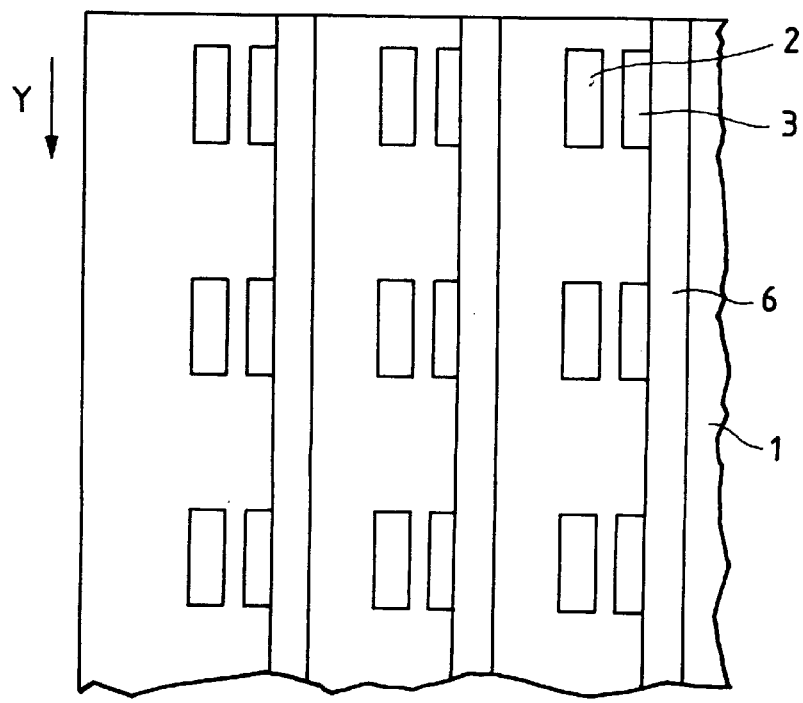
FIG. 19 is a view for explaining the process for manufacturing the electron source, in which first wiring layers are formed.

As shown in FIG. 19, the first wiring layer 6 is formed on the substrate 1 to electrically connect the element electrodes 3 of the element electrodes 2 and 3 aligned in the Y direction to each other. The first wiring layer 6 is preferably made thick to reduce the electrical resistance. For this purpose, the thick film process is preferably used to form the first wiring layer 6. Any paste material can be used as far as it is conductive. A paste material with fine particles of a noble metal such as Ag, Au, Pt, or Pd, a base metal such as Cu, Ni, Al, or Cr, or a mixture thereof dispersed in a vehicle is used. A material having a high viscosity and a high thixotropy is suitable to form a thin line. Thin film wiring can also be applied, as a matter of course. However, to form a thick film by using this method, a longer time than that for the thick film process is required. Therefore, thick film screen printing can be effectively used.

Figure 20:
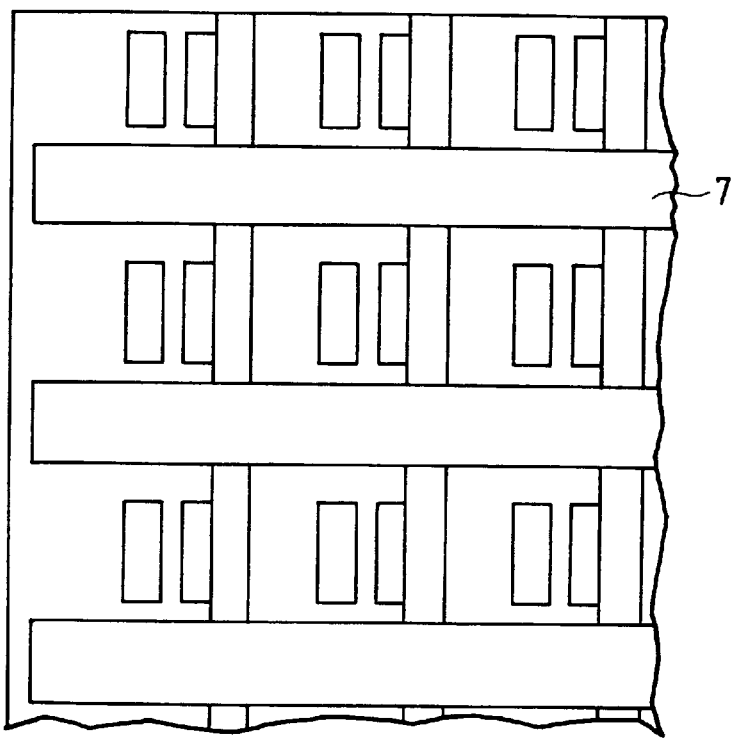
FIG. 20 is a view for explaining the process for manufacturing the electron source, in which insulating interlayers are formed.

After the first wiring layer 6 is formed, the insulating interlayer 7 is formed, as shown in FIG. 20. As is apparent from FIG. 17, the width of the insulating interlayer 7 is set to be larger than that of the second wiring layer 8 which is to be formed in the next step. The reason for this is that a short circuit at the intersection between the first wiring layer 6 and the second wiring layer 8 can be prevented. As a material of the insulating interlayer 7, any of a thin $SiO_2$ film, a film with fine glass particles or fine oxide particles dispersed in a vehicle, and a film consisting of a thick film paste excluding metal components can be used as far as it can maintain insulating properties.

The insulating interlayer 7 can be formed using thick film screen printing.

Figure 21:
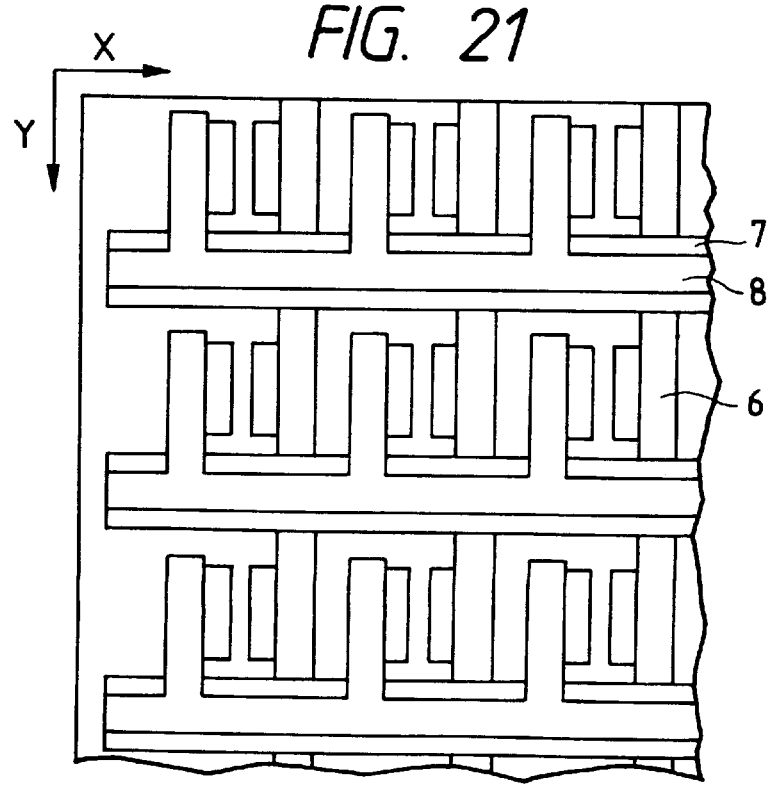
FIG. 21 is a view for explaining the process for manufacturing the electron source, in which second wiring layers are formed.

As shown in FIG. 21, the second wiring layer 8 is formed on the insulating interlayer 7. The wiring layer 8 is arranged to be parallel in the direction for connecting the element electrodes 2 and 3 aligned in the X direction. The second wiring layer 8 has a comb-shaped pattern projecting in a direction parallel to the first wiring layer 6. This arrangement is only to bring the second wiring layer 8 into contact with the electrodes 2 and not substantial.

Figure 27:
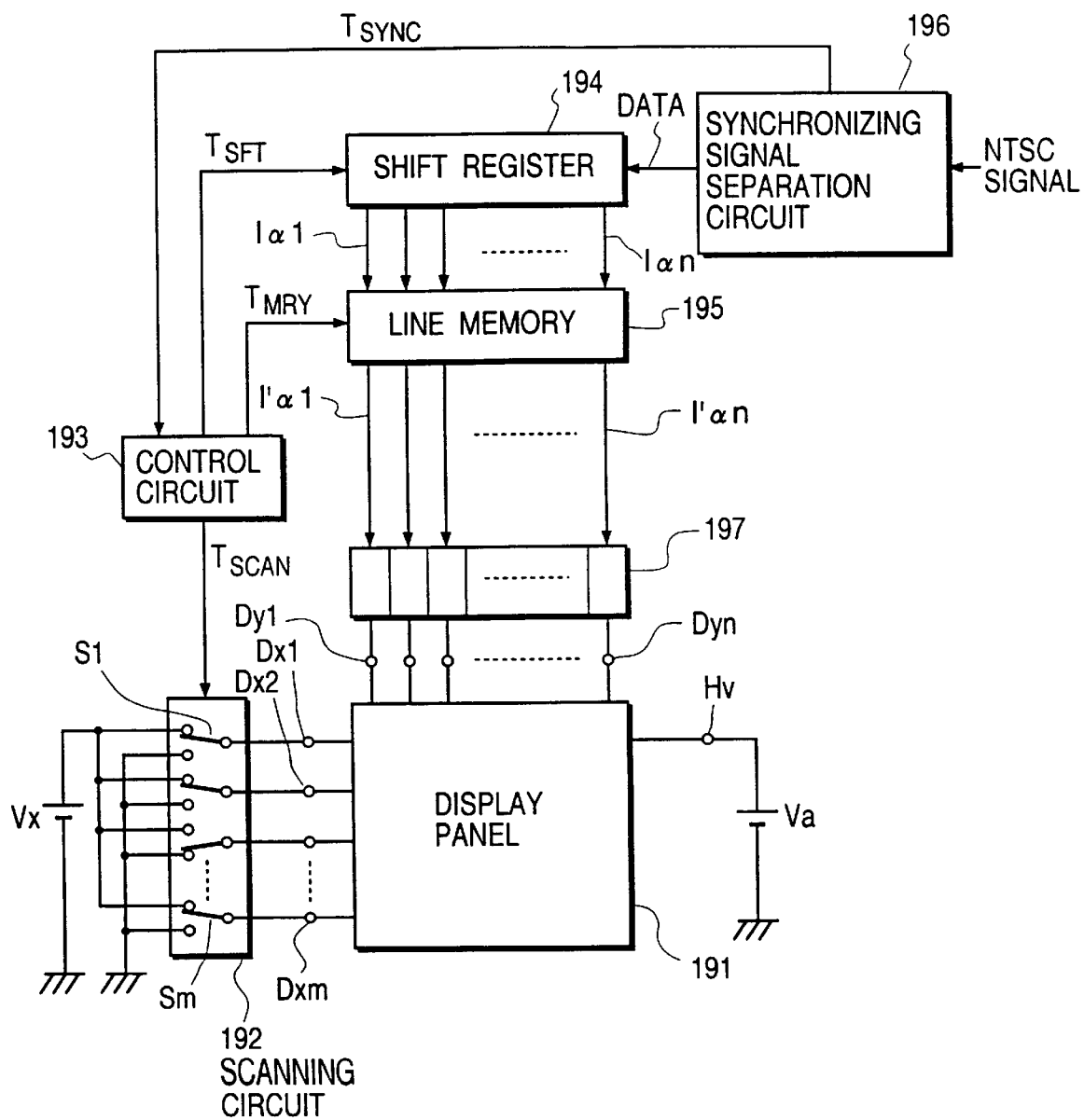
FIG. 27 is a block diagram of a drive circuit for performing display by using an image forming apparatus using the electron source in accordance with an NTSC TV signal.

An image forming apparatus using the electron source shown in FIG. 17 will be described below with reference to FIGS. 4 and 27. FIG. 4 is a diagram showing a display panel of the image forming apparatus using the electron source shown in FIGS. 17, 22, and 23. FIG. 27 is a block diagram of a drive circuit for performing display by using the image forming apparatus using the electron source shown in FIGS. 17, 22, and 23 in accordance with an NTSC TV signal.

Figure 22:
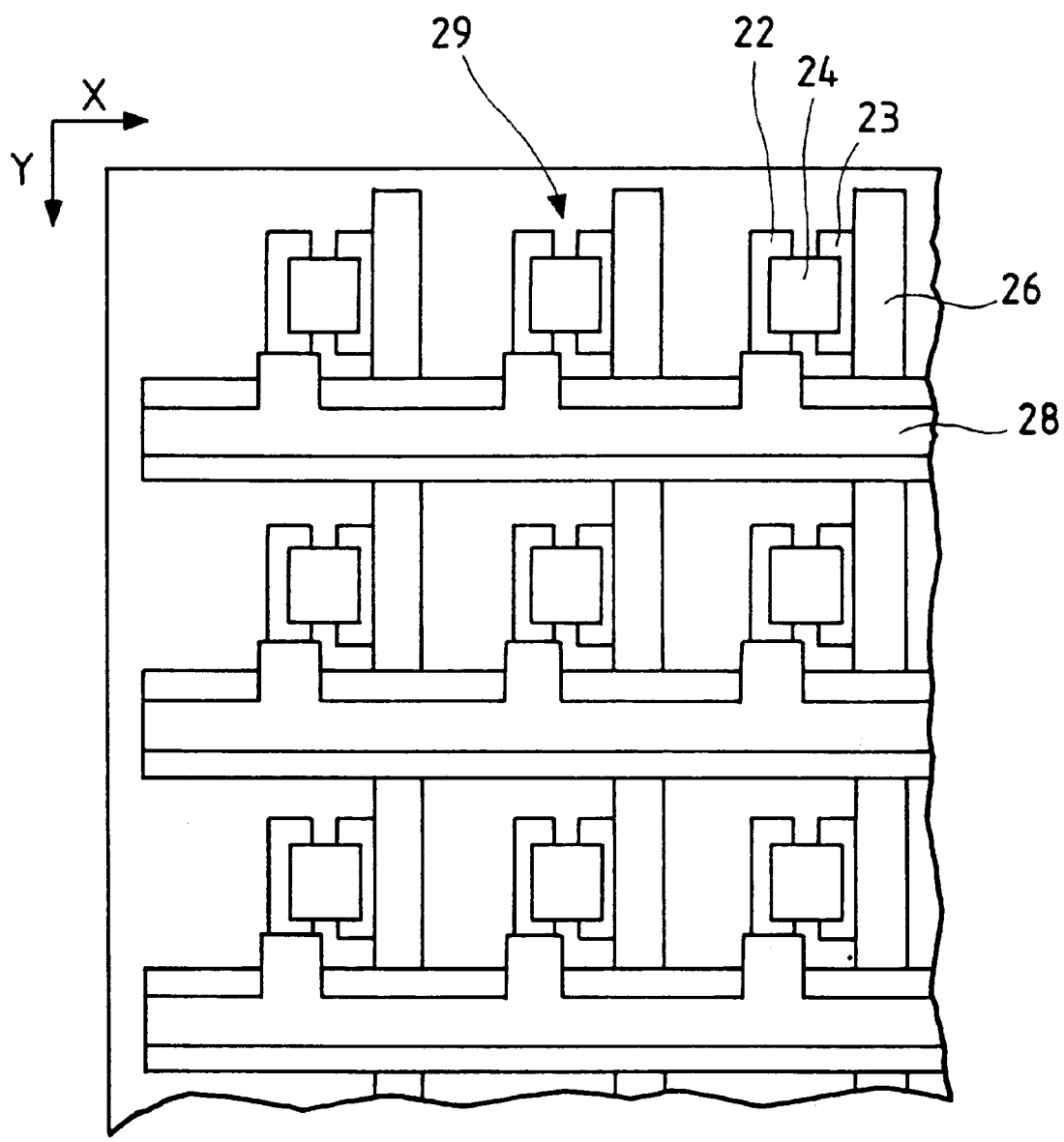
FIG. 22 is a plan view showing the main part of a modification of the wiring.
Figure 23:
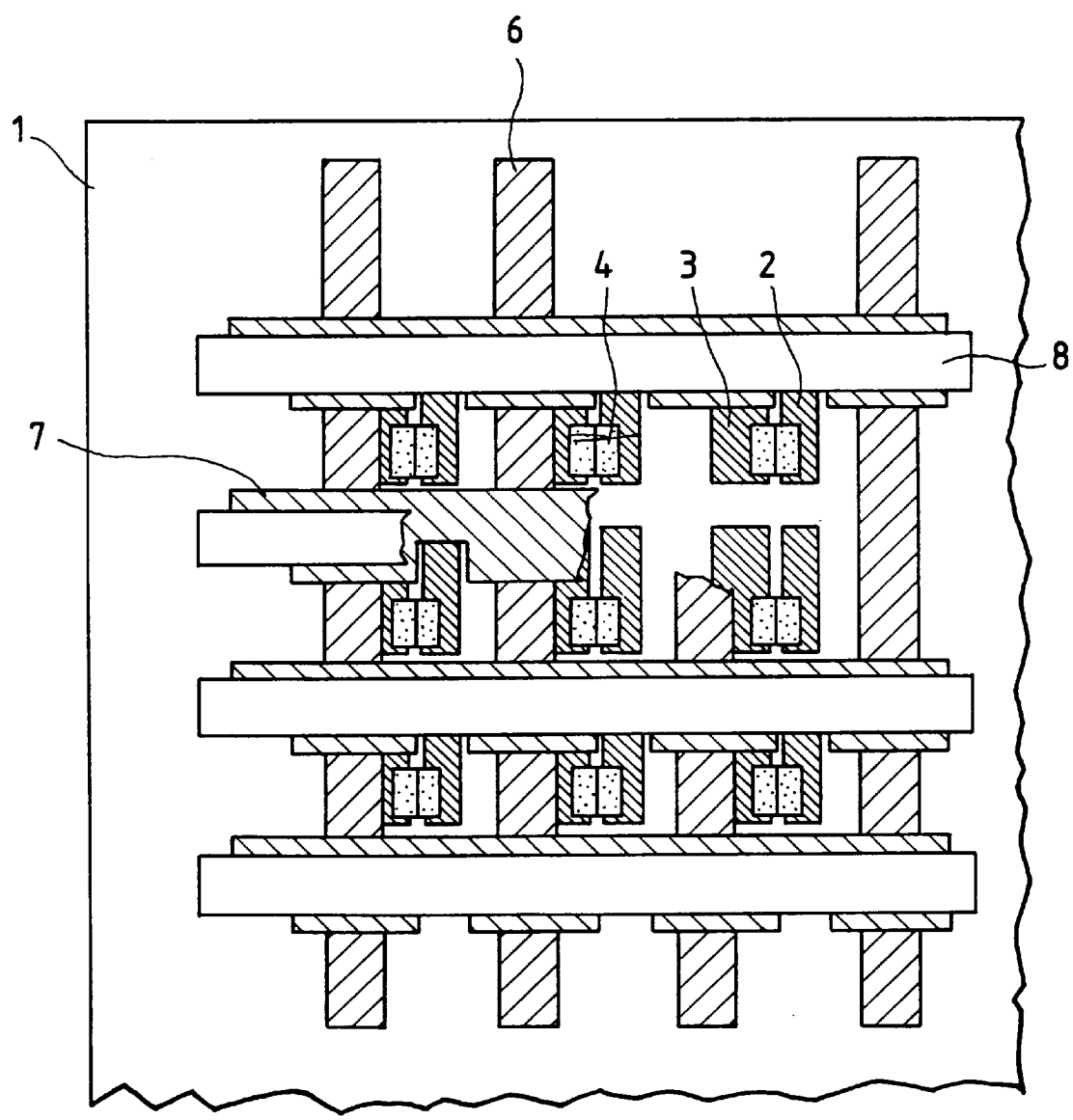
FIG. 23 is a plan view showing the main part of a modification of the insulating interlayer and the wiring.
Figure 24A:
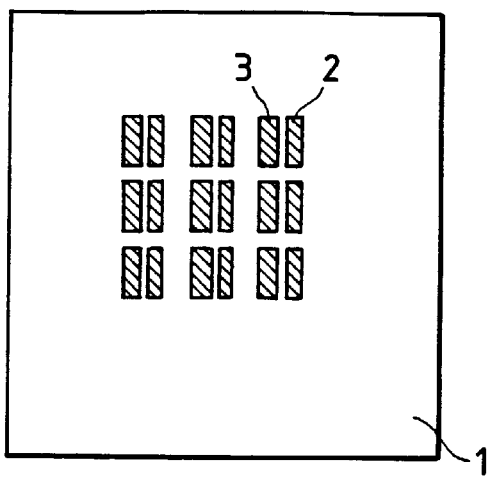
FIGS. 24A through 24E are views for explaining the steps in manufacturing the electron source shown in FIG. 23.
Figure 24B:
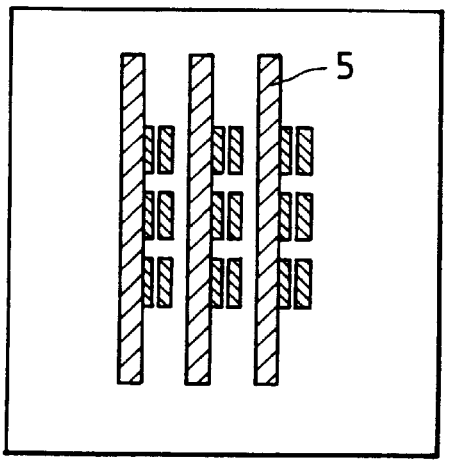
Figure 24C:
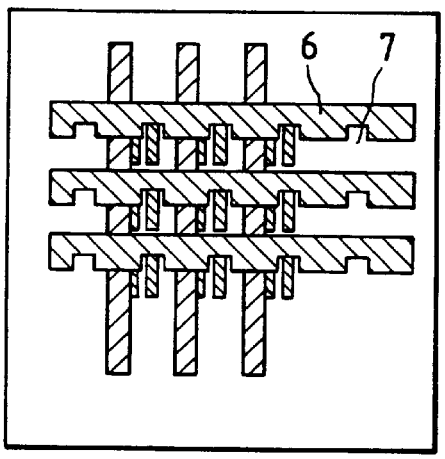
Figure 24D:
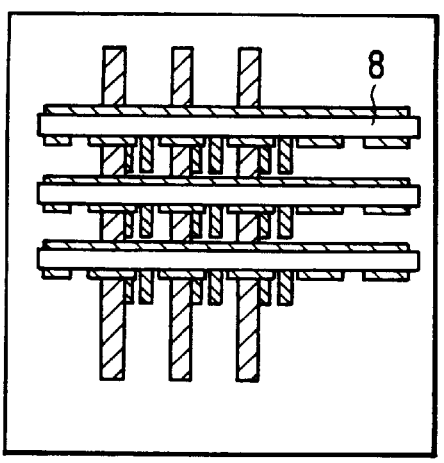
Figure 24E:
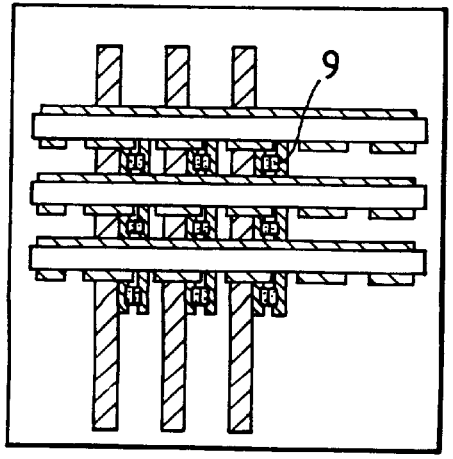

Referring to FIG. 4, an electron source 80 similar to that shown in FIGS. 17, 22, and 23 is fixed to a rear plate 81. Electron emitters 87 of the electron source 80, which are arranged in an m×n matrix, are connected to x-wiring 88 consisting of m wiring lines and y-wiring 89 consisting of n wiring lines, which constitute simple matrix wiring. The x-wiring 88 corresponds to the second wiring layer 8 shown in FIGS. 17, 22, and 23. The y-wiring 89 corresponds to the first wiring layer 6 shown in FIGS. 17, 22, and 23.

In the electron source 80, a face plate 82 on which a phosphor film 84 as an image forming member and a metal back 85 are formed is arranged to oppose the inner face of a glass substrate 83 through a support frame 86. A high voltage for accelerating electrons emitted from the electron source 80 is applied between the electron source 80 and the metal back 85 from a power supply (not shown). The rear plate 81, the support frame 86, and the face plate 82 are hermetically fixed (sealed) to each other. The rear plate 81, the support frame 86, and the face plate 82 constitute a container 90. Sealing of the rear plate 81, the support frame 86, and the face plate 82 is performed by coating the respective fixed surfaces with frit glass and annealing the resultant structure in air or nitrogen at 400° C. to 500° C. for at least ten minutes. In addition, m external terminals Dx1, Dx2, . . . , and Dxm provided to the support frame 86 are connected to the x-wiring 88 while n external terminals Dy1, Dy2, . . . , and Dyn provided to the support frame 86 are connected to the y-wiring 89.

The container 90 is constituted by the face plate 82, the support frame 86, and the rear plate 81, as described above. The rear plate 81 is provided mainly to reinforce the strength of the electron source 80, so the rear plate 81 is not always necessary if the electron source 80 itself has a sufficient strength. The electron source 80 and the support frame 86 may also be directly sealed to each other, and the container 90 may be constituted by the face plate 82, the support frame 86, and the electron source 80. Alternatively, a support member (not shown) called a spacer can be arranged between the face plate 82 and the rear plate 81 to obtain the container 90 with a sufficiently high strength against the atmospheric pressure.

The arrangement of a drive circuit for performing TV display on the basis of an NTSC TV signal will be described below with reference to the block diagram of FIG. 27. The drive circuit includes a display panel 191, a scanning circuit 192, a control circuit 193, a shift register 194, a line memory 195, a synchronizing signal separation circuit 196, a modulation signal generator 197, and DC voltage sources $V_x$ and $V_a$.

The function of each portion will be described below. The display panel 191 is connected to external electric circuits through the terminals Dx1 through Dxm and Dy1 through Dyn, and a high voltage terminal $H_v$. A scanning signal is applied to the terminals Dx1 through Dxm of these terminals to sequentially drive the electron sources provided in the display panel 191, i.e., the electron emitter group arranged in an m×n matrix in units of rows (n elements).

On the other hand, a modulation signal for controlling the output electron beam from each element of the electron emitters of a row selected by the scanning signal is applied to the terminals Dy1 through Dyn. A DC voltage of, e.g., 10 kV is applied from the DC voltage source $V_a$ to the high voltage terminal $H_v$ which is an acceleration electrode for applying a sufficient energy for exciting the phosphor to the electron beam output from the electron emitter.

The scanning circuit 192 will be described below. The scanning circuit 192 has m switching elements (represented by S1 through Sm in FIG. 27). The switching elements select the output voltage from the DC voltage source $V_x$ or a voltage of 0 V (ground level) to be electrically connected to the terminals Dx1 through Dxm of the display panel 191. The switching elements S1 through Sm are operated on the basis of the control signal output from the control circuit 193. Actually, these switching elements can be easily constituted in combination with switching elements such as FETs.

In this embodiment, the DC voltage source $V_x$ is set to output a predetermined voltage on the basis of the characteristics (electron emission threshold voltage) of the electron emitter such that the driving voltage applied to a non-scanned element becomes lower than the electron emission threshold voltage.

The control circuit 193 has a function of matching the operations of the respective portions such that appropriate display is performed on the basis of an externally input image signal. The control circuit 193 generates control signals $T_{SCAN}$, $T_{SFT}$, and $T_{MRY}$ to each portion on the basis of a synchronizing signal $T_{SYNC}$ sent from the synchronizing signal separation circuit 196 (to be described below).

The synchronizing signal separation circuit 196 is a circuit for separating an externally input NTSC TV signal into a synchronizing signal component and a luminance signal component. As is well known, this circuit can be easily constituted by using a frequency separation (filter) circuit. The synchronizing signal separated by the synchronizing signal separation circuit 196 consists of a vertical sync signal and a horizontal sync signal, as is well known, though this signal is represented as the $T_{SYNC}$ signal for the descriptive convenience. On the other hand, the luminance signal component of an image, which is separated from the TV signal, is conveniently represented as a DATA signal. This signal is input to the shift register 194.

The shift register 194 serial/parallel-converts the DATA signal in units of lines of the image, which is input in time series, and is operated on the basis of the control signal $T_{SFT}$ sent from the control circuit 193 (i.e., in other words, the control signal $T_{SFT}$ is a shift clock for the shift register 194). Serial/parallel-converted data corresponding to one line of the image (corresponding to drive data for the n electron emitters) is output from the shift register 194 as n parallel signals Id1 through Idn.

The line memory 195 is a memory device for storing the data corresponding to one line of the image for a necessary time and stores the contents of the signals Id1 through Idn in accordance with the control signal $T_{MRY}$ sent from the control circuit 193. The stored contents are output as signals I'd1 through I'dn and input to the modulation signal generator 197.

The modulation signal generator 197 is a signal source for appropriately driving and modulating each electron emitter in accordance with each of the image data I'd1 through I'dn. The output signal from the modulation signal generator 197 is applied to the electron emitters in the display panel 191 through the terminals Dy1 through Dyn.

With the above-described series of operations, TV display can be performed using the display panel 191. Although not specifically mentioned in the above description, the shift register 194 or the line memory 195 can be of either a digital signal type or an analog signal type as far as serial/parallel conversion or storing of an image signal can be performed at a predetermined speed.

In use of a digital signal type, the output signal DATA from the synchronizing signal separation circuit 196 must be digitized, which can be easily achieved by arranging an A/D converter to the output portion of the synchronizing signal separation circuit 196, as a matter of course. Accordingly, the circuit used for the modulation signal generator 197 slightly changes depending on whether the output signal from the line memory 195 is digital or analog, as a matter of course. More specifically, for a digital signal in voltage modulation, e.g., a well-known D/A converter is used for the modulation signal generator 197, and an amplification circuit and the like can be added as needed. In pulse width modulation, the modulation signal generator 197 can be easily constituted by a skilled in the art by using a circuit formed of a combination of a high-speed oscillator, a counter for counting the number of waves output from the oscillator, and a comparator for comparing an output value from the counter with an output value from the line memory 195. An amplifier for amplifying the pulse width-modulated signal output from the comparator to the driving voltage for the electron emitters may be added as needed.

For an analog signal in voltage modulation, an amplification circuit using a well-known operational amplifier can be used for the modulation signal generator 197. A level shift circuit and the like may be added as needed. In pulse width modulation, e.g., a well-known voltage-controlled oscillator (VCO) can be used. An amplifier for amplifying the voltage to the diving voltage for the electron emitters may be added as needed.

In the image display apparatus with the above arrangement, when a voltage is applied to the electron emitters 87 of the electron source 80 through the terminals Dx1 through Dxm and Dy1 through Dyn, electrons are emitted. When a high voltage is applied to the metal back 85 or a transparent electrode (not shown) through the high voltage terminal $H_v$, the electron beam is accelerated and struck the phosphor film 84. The fluorescence is induced, and an image can be displayed. When the electron source 80 having a wiring structure as shown in FIG. 1 is used, the density of the wiring or the electron emitters 87 can be increased. Therefore, the number of pixels per unit area can be increased to achieve an image forming apparatus having a high resolution.

The above-described arrangement is necessary for manufacturing an image forming apparatus suitable for display. The material of each portion and detailed portions are not limited to the above-described contents and can be appropriately selected in accordance with the application purpose of the image forming apparatus. As an input signal, the NTSC system has been described. However, the PAL or SECAM system may also be applied. A TV signal (e.g., a high-definition TV represented by the MUSE system) consisting of a large number of scanning lines may also be applied.

Figure 16A:
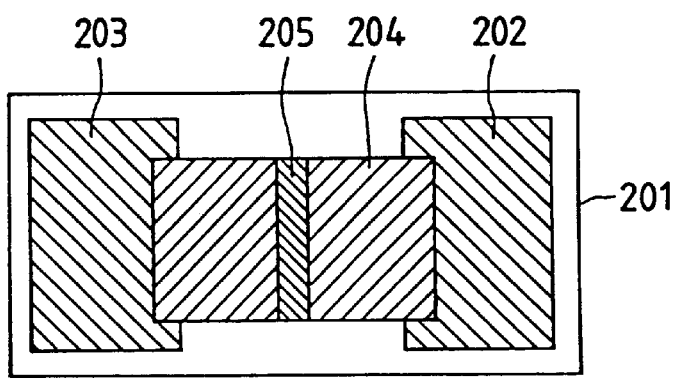
FIGS. 16A and 16B are specific diagrams illustrating another surface conductive emitter example.
Figure 16B:
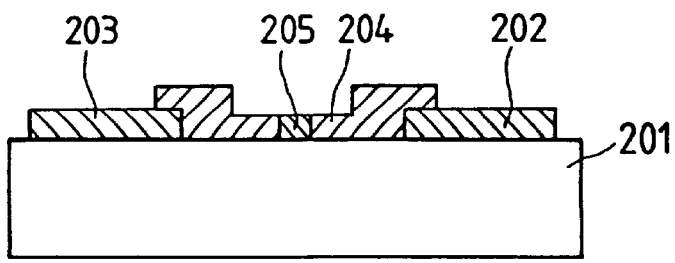
Figure 25:
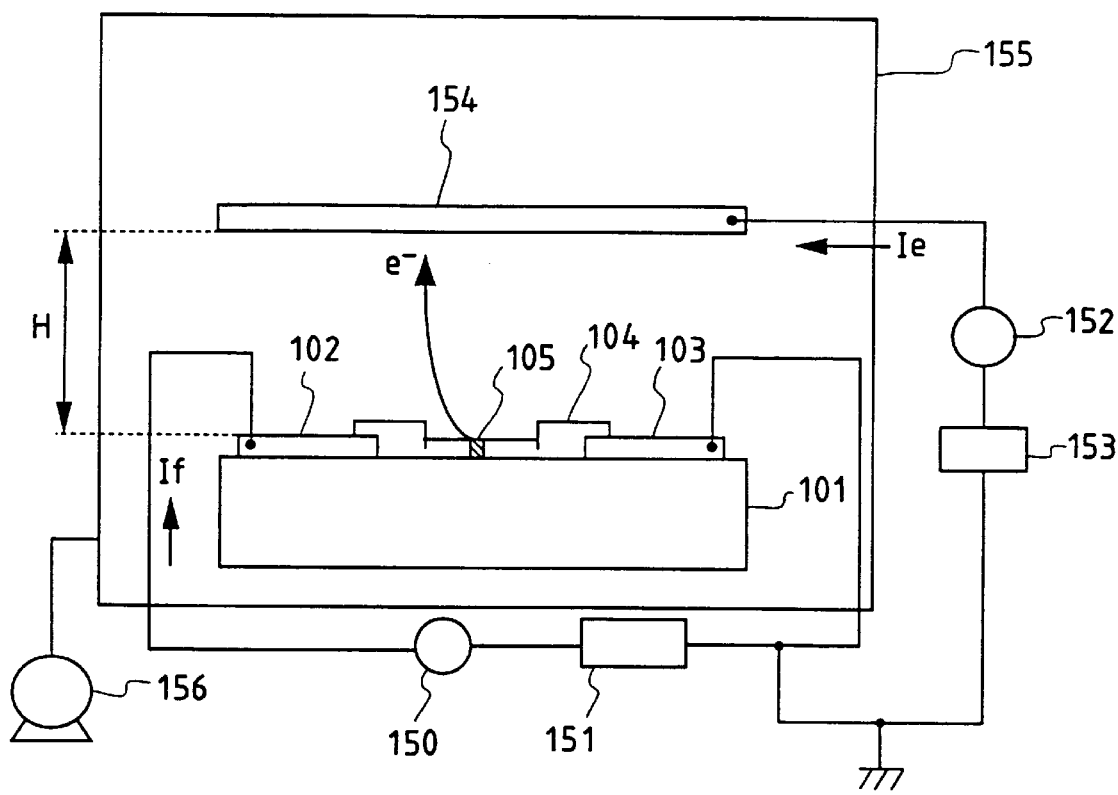
FIG. 25 is a diagram showing the arrangement of a measurement evaluation apparatus for measuring the electron emission characteristics of the element.

FIG. 25 is a diagram showing the arrangement of a measurement evaluation apparatus for measuring the electron emission characteristics of an element having the arrangement shown in FIG. 16. The same reference numerals as in FIG. 16 denote the same elements in FIG. 25. A power supply 151 applies a voltage across element Vf to the electron emitter. An ammeter 150 measures a current through element If flowing through a conductive thin film 104 between element electrodes 102 and 103. An anode electrode 154 captures a discharge current Ie discharged from an electron emission portion 105 of the element. A high voltage power supply 153 applies a voltage to the anode electrode 154. An ammeter 152 measures the discharge current Ie discharged from the electron emission portion 105 of the element.

The electron emitter and the anode electrode 154 are arranged in a vacuum unit. The vacuum unit has necessary equipments such as an exhaust pump 156 and a vacuum gage, so that measurement evaluation of the element can be performed in a desired vacuum state. The exhaust pump 156 is constituted by a normal high vacuum unit system consisting of a turbopump and a rotary pump, and an ultra high vacuum unit system consisting of an ion pump. An entire vacuum unit 155 and a substrate can be heated up to 200° C. by a heater (not shown). Therefore, in this measurement apparatus, processes after the forming process can also be performed. Measurement was performed while the voltage of the anode electrode 154 was set within the range of 1 to 10 kV, and a distance H between the anode electrode 154 and the electron emitter was set within the range of 2 to 8 mm.

Figure 26:
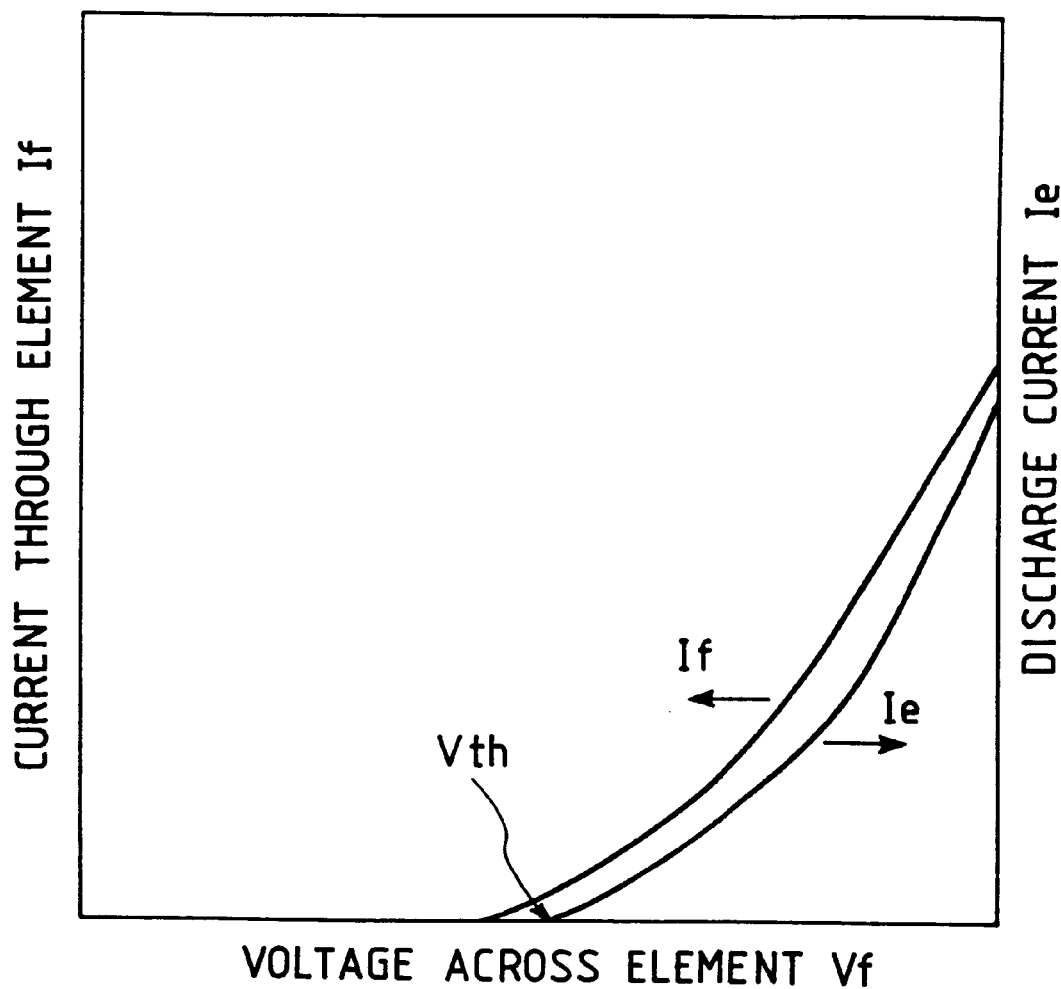
FIG. 26 is a graph showing the typical relationship among a discharge current Ie, a current though element If, and a voltage across element Vf.

FIG. 26 shows the typical relationship among the discharge current Ie, the current through element If, and the voltage across element Vf, which were measured by the measurement evaluation apparatus shown in FIG. 25. Since the discharge current Ie is much smaller than the current through element If, it is represented by an arbitrary unit in FIG. 26. The ordinate and abscissa are represented by a linear scale.

As is apparent from FIG. 26, the surface conductive electron emitter suitable for the present invention has three characteristic features with respect to the discharge current Ie.

First, when the voltage across element Vf higher than a predetermined voltage (called a threshold voltage Vth in FIG. 26) is applied to this element, the discharge current Ie abruptly increases. At a voltage lower than the threshold voltage Vth, the discharge current Ie is hardly detected. That is, this element is a non-linear element having the specific threshold voltage Vth with respect to the discharge current Ie.

Second, since the discharge current Ie depends on the voltage across element Vf, the discharge current Ie can be controlled by the voltage across element Vf.

Third, discharged charges captured by the anode electrode 154 depend on the application time of the voltage across element Vf. That is, the charge amount captured by the anode electrode 154 can be controlled by the application time of the voltage across element Vf.

Because of the characteristic features of the surface conductive electron emitter suitable for the present invention, the electron emission characteristics can be easily controlled by the electron source having a plurality of electron emitters, or the image forming apparatus in accordance with an input signal. Therefore, the electron emitter can be applied in a variety of fields.

The current through element If monotonically increases with respect to the voltage across element Vf (called MI characteristics). These more preferable characteristics are indicated by a solid line in FIG. 10. In addition, the current through element If sometimes exhibits a voltage controlled negative resistance (called VCNR characteristics) with respect to the voltage across element Vf. The characteristics of the current through element If depend on the manufacturing method and measurement conditions in measurement. In this case as well, the electron emitter has the three characteristic features.

In the above evaluation apparatus, a voltage is applied between the element electrodes 102 and 103 to cause the electron emission portion 105 to emit electrons. When a voltage is applied from the high voltage power supply 153 to the anode electrode 154, the emitted electrons travel while shifting to the positive electrode side (element electrode 102 side in FIG. 9) of the voltage applied to the element with respect to the normal from the electron emission portion 105 to the surface of a substrate 101. Such radiation characteristics are obtained because the potential distribution in a plane parallel to the substrate 101 is asymmetrical about the electron emission portion 105.

According to the present invention, it will be easily understood that the following effects can be acquired.

(1) Since the rates of gas adsorption and the gas discharge by printed pattern wiring are extremely low, an image forming display is very stable.

(2) Since printing and plating are employed, manufacturing costs for a circuit board and an image forming apparatus can be drastically reduced.

(3) Since vacuum deposition and photolithography are employed for the formation of necessary portions, a highly functional element that is very accurately controlled can be formed over a large area on a substrate.

(4) Since a voltage drop and a delay in the drive signal due to a wiring resistance can be reduced, an image forming device with a reduced degrading in an image quality can be provided.

The present invention will now be described in detail while referring to specific embodiments. The present invention is, however, not limited to these embodiments, and the replacement of components and alteration of the design may be performed to the extent that the achievement of the objects of the present invention is not jeopardized.

(5) With a wiring arrangement considering the traveling process of electrons emitted from the electron emitter, the electrons can be prevented from striking against the wiring.
(Embodiment 1)

Embodiment 1 will be explained while referring to FIGS. 1A through 3.

In FIG. 3, a substrate 1 is made of soda lime glass, and printed wiring 5 and printed wiring 6, which have a thickness of about 7 microns, are acquired by printing and annealing Ag paste ink.

After the formation of the printed wiring 5 and the printed wiring 6, element electrodes 2 and 3 are formed by photolithographic technology. The element electrodes 2 and 3, respectively, are connected to the printed wiring 5 and the printed wiring 6, and are composed of Ni thin film that are 1000 Å thick and that employ Ti at a thickness of 50 Å as an underlayer. The electrode interval is 2 microns at the center and the width of the electrodes is 300 microns.

A thin film 4 that consists of Pd particles having a thickness of about 200 Å is acquired by coating with an organic metal compound solution and annealing. Sequentially, a Cr film was deposited by sputtering on a portion where the thin film 38 is not required, and a Cr pattern was fabricated by photolithographic technology.

Plated wiring 7 and plated wiring 8 are provided on the printed wiring 5 and the printed wiring 6 by plating with Cu to a thickness of about 50 microns and a width of about 400 microns. After masking has been performed by using a resist on a portion where plating is not required, plating is performed by using the pyrophosphoric acid copper plating bath in Table 1.

TABLE 1

| | |
|---|---|
| Pyrophosphoric copper ($CuP_2O_7 \cdot 3H_2O$) | 80 g/l |
| Pyrophosphoric potassium ($K_4P_2O_7$) | 300 g/l |
| Ammonia solution | 2 ml/l |
| Bath temperature | 50° C. |
| Cathode current density | 4 A/dm$^2$ |

In FIG. 3, a glass substrate 9, which is a soda lime plate, is located opposite to the substrate 1 at an interval of 5 mm.

A phosphor 10 is located on the substrate 9, at a position that corresponds to an interval between the element electrodes 2 and 3, which are located on the opposite substrate 1. A phosphor is mixed with a photosensitive resin to make a slurry and the mixture is deposited and dried. Patterning is then performed by photolithography to form the phosphor 10. A filming procedure is performed on the phosphor 10, an Al thin film of about 300 Å thick is deposited by vacuum evaporation, and the film layer is removed by annealing. A metal back 11 is thus provided. The structure where the elements are formed on the substrate 1 is called an element substrate, while the structure where the phosphor 10 and the metal back 11 are formed on the glass substrate 9 is called a face plate.

A grid electrode 13 is located between the element substrate and the face plate. The above described components were arranged in a vacuum container, and when a voltage was applied between the plated wiring 7 and the plated wiring 8 to perform a forming process on the thin film 4, an electron emission portion 12 was formed. Then, with the metal back 11 being used as an anode electrode, a voltage of 3 kV for emitting electrons was applied, while a voltage of 14 V that was transmitted across the plated wiring 7 and the plated wiring 8 was applied to the electron emission portion 12 from the element electrodes 2 and 3. Electrons were thereupon emitted. The emitted electrons were controlled by changing the voltage of the grid electrode 13, and the amount of emitted electrons with which the phosphor 10 was irradiated could be adjusted. Therefore, the phosphor 10 could emit light arbitrarily to display an image.

On a 40 cm square element substrate, a 350×350 matrix of electron emitters was arranged at an arrangement pitch of 1 mm. On the face plate that is opposite the element substrate, were located separate R, G and B phosphors 10. When the positioning accuracy of the printed wiring 5 and the printed wiring 6 on the element substrate was measured, a 30-micron positioning shift was found to have occurred at the end of the substrate with the center of the substrate as an origin. On the other hand, the positioning of the phosphor 10 relative to the position of the electron emission portion 12, on which patterning was performed by photolithography, was found to be highly accurate with a positioning difference of 4 microns or less. Therefore, when a 350×350 pixel image was displayed on the 40 cm square substrate, crosstalk at a luminance point, which occurs due to a positioning shift of the electron emitter and the phosphor, was not caused.

Further, the wiring resistance of the plated wiring 7 and the plated wiring 8 could be reduced to about 0.5Ω between both ends of the 40 cm square substrate, a value which was ¹⁄₁₀ or less than the wiring resistance of only the printed wiring 5 and the printed wiring 6. Therefore, the problems, such as drive signal voltage drops and signal delays, which are caused in the 40 cm square substrate could be substantially removed. Since the printed wiring 5 and the printed wiring 6 are printed and annealed before the element that consists of the element electrodes 2 and 3 and the thin film is fabricated, the printing and annealing processes are not performed on this element and the element is therefore not damaged by heat during the annealing. According to the image forming apparatus of the Embodiment, the adsorption of gas by, or the discharge of gas from wiring that has inferior density could be held at zero, or be reduced considerably low. Thus, changes in the degree of vacuum in the vacuum container that constitutes the image forming apparatus could be limited to considerably small values. And an excellent display image condition could be stably formed for an extended period of time.

(Embodiment 2)

Embodiment 2 will now be described while referring to the procedure diagrams (plan views) in FIGS. 5A through 5E. An example where nine electron emitters, together with wiring, are arranged in a 3×3 matrix on a soda lime glass substrate (not shown) is employed.

In FIGS. 5A through 5E, printed pads 22, which are arranged so that they are in parallel to lower printed wiring 21, are formed by annealing a printed metal paste following the same procedures that are employed for the lower printed wiring 21. Element electrodes 26 and 27, which are respectively connected to the lower printed wiring 21 and the printed pads 22, are formed by photolithography and by using a metal thin film. The element electrodes 26 and 27 have an electrode interval of 2 microns and an electrode width of 200 microns at a mutually adjacent portion. A thin film 28 includes an electron emission portion, which consists of Pd particles of an electron emitting material, and is located on and between the element electrodes 26 and 27. A thin film portion 29 that is located at each electrode gap serves as an electron emission portion, which will be described later. Plated wiring 30 is metallic wiring having a thickness of about 100 microns that is plated as a strip on upper printed wiring 25.

A method for manufacturing this element substrate will now be described while referring to FIGS. 5A through 5E.

Figure 5A:
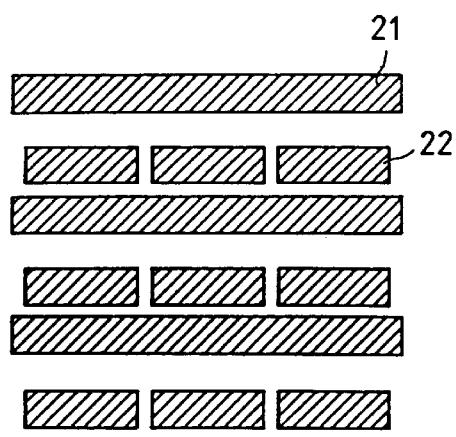
FIGS. 5A through 5E are specific diagrams illustrating another electric wiring example that can be applied to the present invention.

Screen printing was performed with Ag paste ink on a soda lime glass substrate that was washed well. By annealing the substrate, the lower printed wiring 21 having a 7 micron thickness and the print pads 22 were formed (FIG. 5A).

Figure 5B:
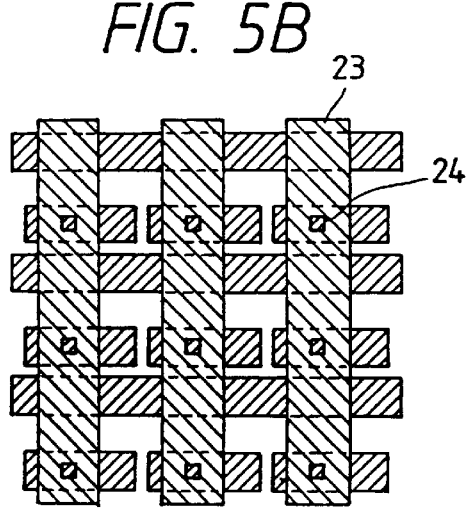

Then, screen printing was performed using glass paste ink, and by annealing the resultant structure, an insulating layer 23 that is 500 microns wide and about 20 microns thick, and contact holes 24 with 100 microns square openings were provided (FIG. 5B).

Figure 5C:
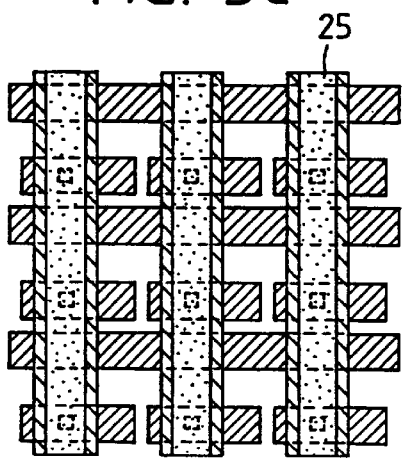

Thereafter, Ag paste ink was deposited on the insulating layer 23 by screen printing, and by annealing the resultant structure, the upper wiring 24 that is 300 microns wide and 10 microns thick was formed (FIG. 5C). The upper wiring 25 and the printed pads 22 were then electrically conductive via the contact holes 24. At this time, step covers for the contact holes 24 are sometimes insufficient when the thickness of the upper wiring 25 is 10 microns in contrast to the thickness of 20 microns for the insulating layer 23. However, the formation of plated wiring during the following procedure can provide sufficient step cover for the contact holes 24.

Figure 5D:
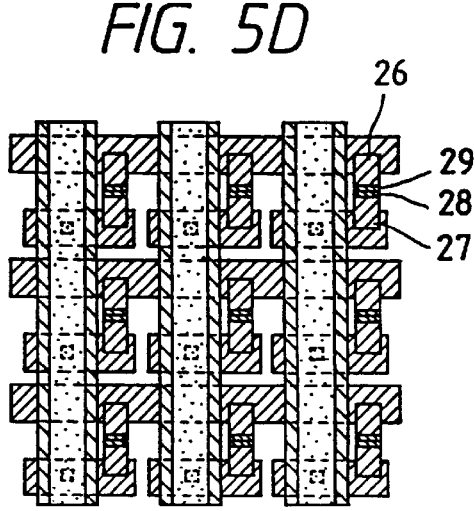
Figure 5E:
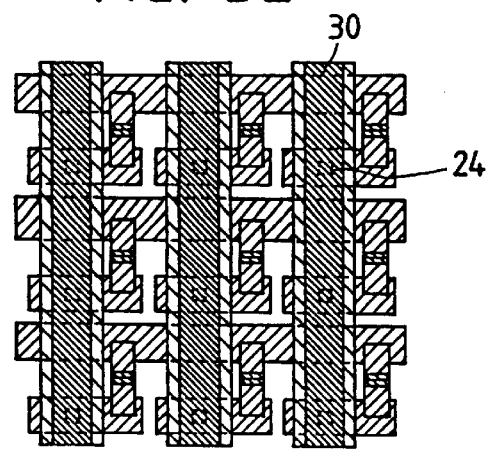

A 50 Å underlayer made of Ti was formed by sputtering, and was overlaid with 1000 Å of Ni. Then, a photoresist pattern was fabricated in the shape of the element electrode by exposing a projection mask aligner, and the element electrodes 26 and 27 were formed by etching. Sequentially, a Cr film was deposited by sputtering on a portion where the thin film 28 is not required, and a Cr pattern was fabricated by photolithographic technology. An organic palladium compound solution (Catapaste CCP4230, a product name of Okuno Pharmaceutical Co., Ltd.) was deposited and annealed to form a Pd particle film. Further, reverse etching was performed on the Cr pattern and patterning of the thin film 28 was performed at the element electrodes 26 and 27 and at electrode gaps (FIG. 5D).

The plated resist was formed by photolithography so as to expose the upper printed wiring 25. The upper printed wiring 25 was rendered conductive and electrolyte plating with Cu was performed on the wiring 25 to provide a plated film of 100 μm. The plating bath employed in this case is the copper sulfate bath shown in Table 2.

TABLE 2

| Copper sulfate ($CuSO_4$) | 100 g/l |
| Sulfuric acid ($H_2SO_4$) | 180 g/l |
| Bath temperature | 40° C. |
| Cathode current density | 5 A/dm² |

The element substrate was manufactured by removing the plated resist. At this time, the Cu plated film was deposited and was also adequately extended inside the contact holes 24, so that sufficient electric conductivity could be acquired between the printed pads 22 and the upper printed wiring 25.

This element substrate, where a 350×350 matrix of electron emitters was arranged on a 40 cm square substrate as in Embodiment 1, was positioned in the vacuum container together with the face plate on which were phosphors for R, G, and B. Then, forming processing for the electron emitters was performed. An arbitrary voltage signal of 14 V was applied to the upper printed wiring of this element substrate, a potential of 0 V was applied to the lower printed wiring, and a potential of 7 V was applied to the other wiring. When an anode voltage of 3 kV was applied to the metal back on the face plate, an arbitrary image could be displayed. Crosstalk at the luminance point, which is caused by the shifting of the positions of the electron emitters and the phosphors, did not occur. The wiring resistance of the plated wiring 30 could be reduced to approximately 0.5Ω between both ends of the substrate, and voltage drops and signal delays could be essentially eliminated.

Further, since the electron emitters, which consist of the element electrodes 26 and 27 and the thin film 28, were fabricated after the printed wiring was annealed, the emitters were not subjected to the annealing process. Thus, the emitters were not damaged by heat during the annealing of the printed wiring.

In addition, the lower printed wiring 21 and the printed pads 22 are identical layers on the substrate, and the contact to the electrodes 26 and 27 will not be cut off en route because the element electrodes 26 and 27 are formed on the substrate where there is no step on the surface and are connected to the printed wiring 21 and the printed pads 22.

(Embodiment 3)

Embodiment 3 will now be described while referring to the procedure diagrams (plan views) in FIGS. 6A through 6E. An example where nine electron emitters are arranged in a 3×3 matrix together with wiring on a soda lime glass substrate (not shown) is employed.

In FIGS. 6A through 6E, lower printed wiring 31 is formed with a horizontally extended strip shape by annealing a print metal paste. An insulating layer 32 of print glass paste is deposited on almost the entire area and annealed. Contact holes 33 are openings in the insulating layer 32 and are positioned above the lower printed wiring 31. Upper printed wiring 34 is not exposed in the diagram since it is the underlayer for plated wiring 40. The upper printed wiring 34 is formed above the insulating layer 32 in a strip shape that has narrow portions. Narrow printed pads 35 are provided in the same procedure as is the upper printed wiring 34 by annealing print metal paste. The printed pads 35 are electrically connected via the contact holes 33 to the lower printed wiring 31. Element electrodes 36 and 37, which are respectively connected to the upper printed wiring 34 and the printed pads 35, are formed by photolithography and by using a metal thin film. The element electrodes 36 and 37 have electrode intervals of 2 microns with electrode widths of 300 microns at mutually adjacent portions. A thin film 38 includes an electron emission portion, which consists of Pd particles of an electron emitting material, and is located at and between the element electrodes 36 and 37. A thin film portion 39 that is located at each electrode gap serves as an electron emission portion, which will be described later. Plated wiring 40 is metallic wiring that is about 75 microns thick and that is formed by plating over the upper printed wiring 34.

A method for manufacturing this element substrate will now be described while referring to FIGS. 6A through 6E.

Figure 6A:
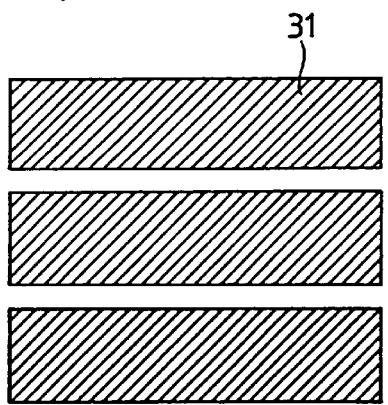
FIGS. 6A through 6E are specific diagrams illustrating an additional electric wiring example that can be applied to the present invention.

Screen printing was performed with Ag paste ink on a soda lime glass substrate that was washed well. By annealing the substrate, the lower printed wiring 31, with a 7 micron thickness and with an 800 micron width, was formed (FIG. 6A).

Figure 6B:
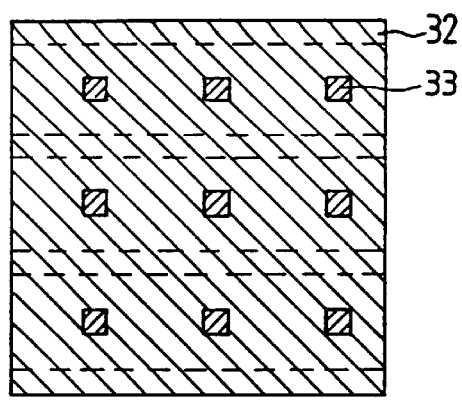

Then, screen printing was performed with glass paste ink, and by annealing the resultant structure, an insulating layer 32 about 20 microns thick, in which were contact holes 33 with 200 microns square openings, was provided over almost the entire surface (FIG. 6B).

Figure 6C:
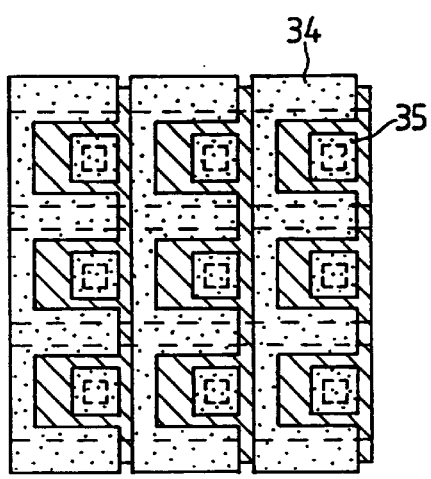

Further, Ag paste ink was deposited on the insulating layer 32 by screen printing, and the resultant structure was annealed to form the upper wiring 34, 900 microns wide and 10 microns thick, whereon depressions of 700 microns were partially provided. During this procedure, the printed pads 35 of 400 micron square were formed at the same time (FIG. 6C). The lower wiring 31 and the printed pads 35 were then electrically conductive via the contact holes 33. At this time, step cover for the contact holes 33 is sometimes insufficient when the thickness of the printed pads 35 is 10 microns in contrast to the thickness of 20 microns for the insulating layer 32. In such a case, screen printing for the contact holes 33 was performed with Ag paste ink before the formation of the plated pads 35. Then, when the resultant structure was annealed to provide contact pillars, sufficient step cover for the contact holes 33 could be acquired.

Figure 6D:
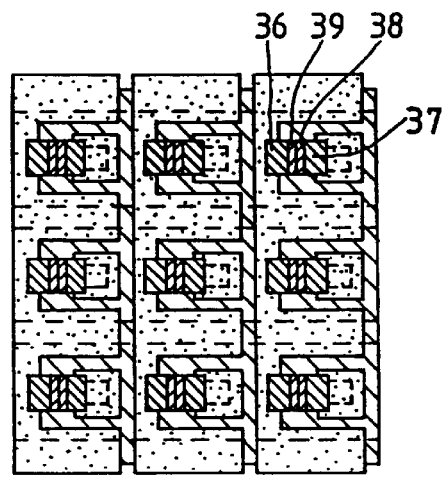
Figure 6E:
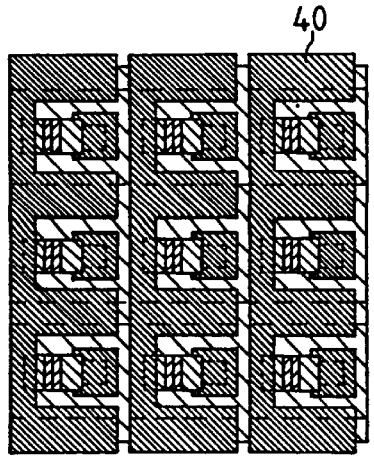

A 50 Å underlayer made of Ti was formed by sputtering, and was overlaid with 1000 Å of Ni. Then, a photoresist pattern was fabricated in the shape of the element electrode by exposing a projection mask aligner, and the element electrodes 36 and 37 were formed by etching. Sequentially, a Cr film was deposited by sputtering on a portion where the thin film 38 is not required, and a Cr pattern was fabricated by photolithographic technology. An organic palladium solution (Catapaste CCP4230, a product name of Okuno Pharmaceutical Co. , Ltd.) was deposited and annealed to form a Pd particle film. Further, reverse etching was performed on the Cr pattern and patterning of the thin film 38 was performed at the element electrodes 36 and 37 and at electrode gaps (FIG. 6D).

The plated resist was formed by photolithography so as to expose the upper printed wiring 34. The upper printed wiring 25 was rendered conductive and electrolyte plating with Cu was performed on the wiring 34 to provide a plated film of 75 μm. The plating bath employed in this case is the copper sulfate bath shown in Table 3.

TABLE 3

| | |
|---|---|
| Copper sulfate (CuSO$_4$) | 100 g/l |
| Sulfuric acid (H$_2$SO$_4$) | 160 g/l |
| Bath temperature | 50° C. |
| Cathode current density | 5 A/dm$^2$ |

The element substrate was manufactured by removing the plated resist.

As in Embodiment 2, a 350×350 matrix of electron emitters was arranged on a 40 cm square substrate that was positioned in a vacuum container together with the face plate on which were phosphors for R, G, and B.

When electric driving was performed in the same manner as in Embodiment 2, an image of excellent quality could also be displayed for this embodiment.
(Embodiment 4)

Figure 7:
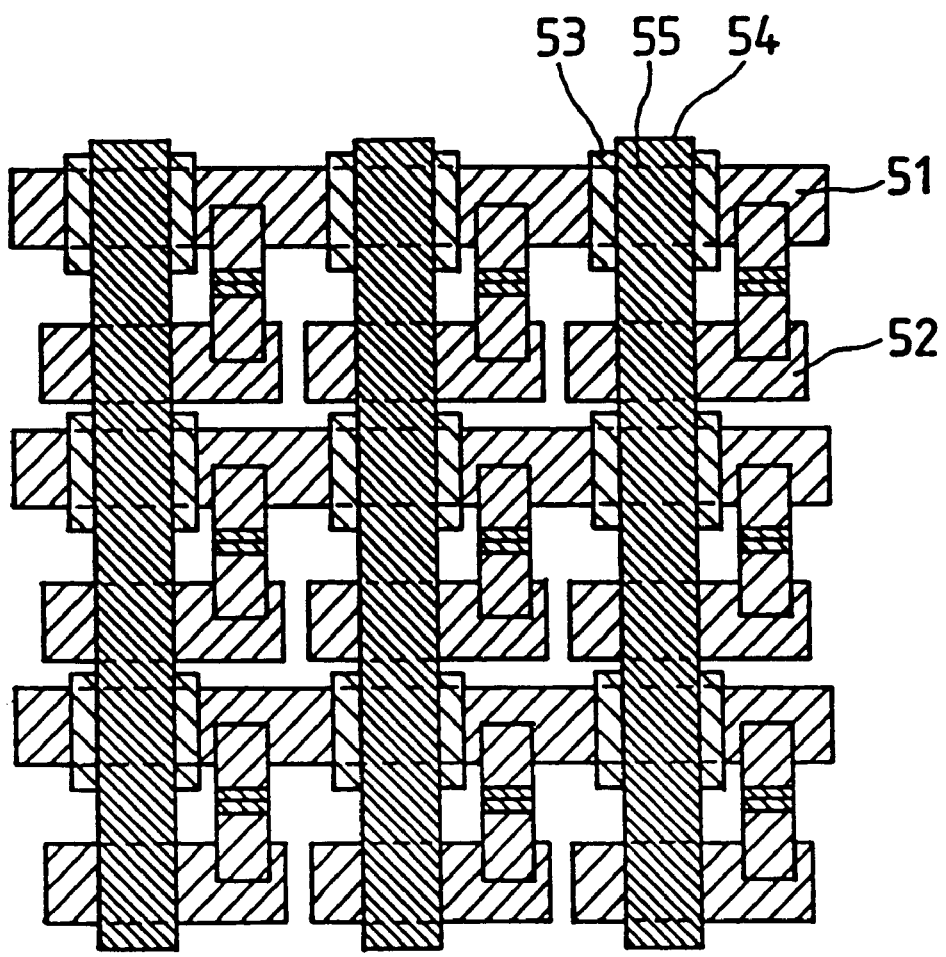
FIG. 7 is a specific diagram illustrating a further electric wiring example that can be applied to the present invention.
Figure 8A:
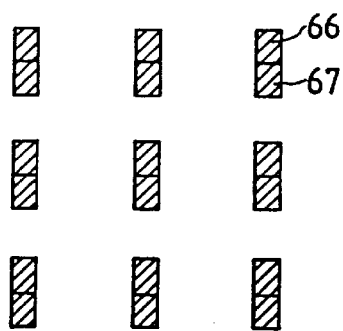
FIGS. 8A through 8F are specific diagrams illustrating one more electric wiring example that can be applied to the present invention.
Figure 8B:
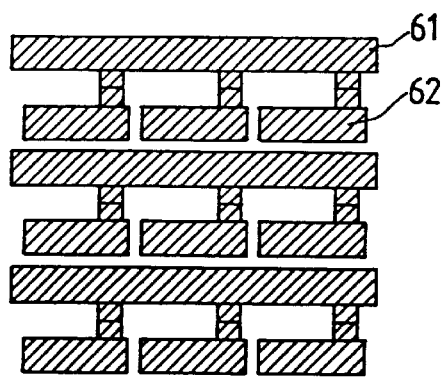
Figure 8C:
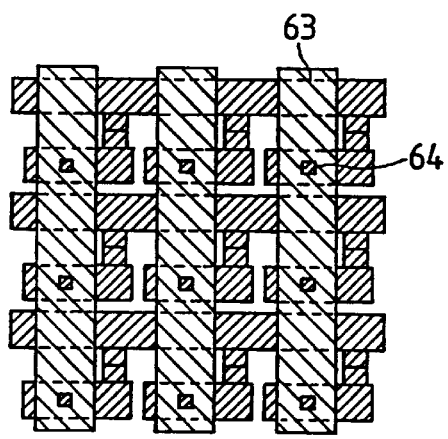
Figure 8D:
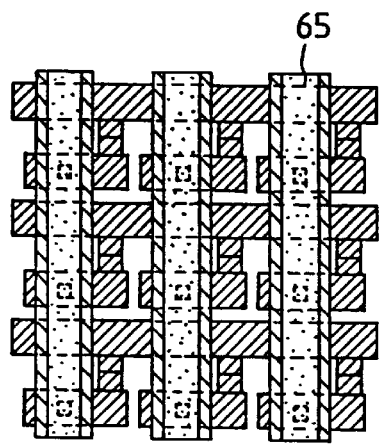
Figure 8E:
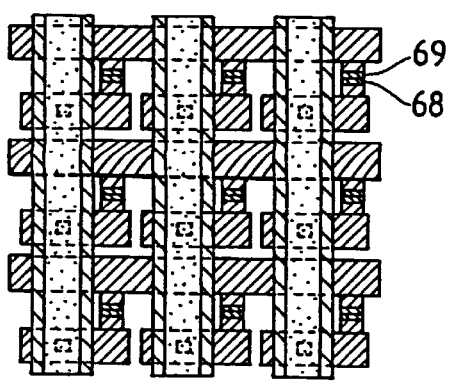
Figure 8F:
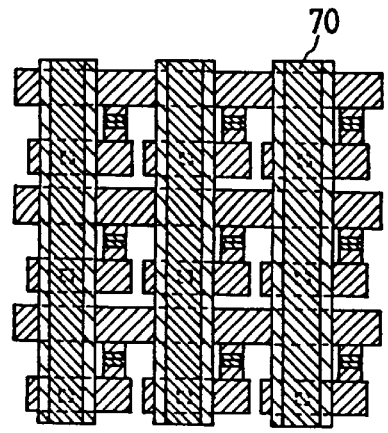

A substrate shown in FIG. 7 was manufactured in the same manner as in Embodiment 2, except that contact holes were not formed. In FIG. 7, reference number 51 denotes lower printed wiring; 54, upper printed wiring; 52, printed pads that are projecting portions of the upper printed wiring 54, or that are formed separately from the upper printed wiring and that contact the upper printed wiring 54; 53, insulating layers; and 55, plated wiring.

The thus fabricated structure could provide the same effect as in Embodiment 2. Especially, fractures did not occur at locations where the element electrodes were connected to rough, uneven portions of the printed wiring and the printed pads.
(Embodiment 5)

FIGS. 8A through 8F are plan views of Embodiment 5 where the fabrication procedures that are employed differ from those in Embodiment 2.

In FIGS. 8A through 8F, element electrodes 66 and 67 are formed in a first procedure by photolithography and by using a metal thin film. Lower printed wiring 61 and printed pads 62 are formed in a single procedure by annealing print metal paste. In this procedure, the element electrodes 66 and 67 are respectively connected to the lower printed wiring 61 and the printed pads 62. Insulating layers 63 with a strip shape are formed by annealing printed glass paste, and in them are contact holes 63, openings that are positioned in the center of the intersections with the printed pads 62. Upper printed wiring 65 is connected to the printed pads 62. Thin films 68 that consist of Pd particles of an electron emitting material are provided at the element electrodes 66 and 67 and at the electrode gaps. Thin film portions 69 at the electrode gaps serve as electron emission portions. Plated wiring 70 with a strip shape is formed by plating on the upper printed wiring 75.

As is described above, according to the fabrication procedures in this embodiment, element electrodes that are part of an active element are formed during the first procedure, and then printed wiring and printed pads are deposited. In this embodiment, the element electrodes, which are formed by photolithography, can be adequately connected electrically to the lower printed wiring and the printed pads, which are formed by a printing process.

The thus manufactured substrate can provide the same effects as those provided by Embodiment 2. Especially, the element electrodes can be adequately connected electrically to the printed wiring and the printed pads.

Although the fabrication procedures in Embodiment 2 are changed and employed for this embodiment, the fabrication procedures are not thus limited, and in Embodiment 3, the element electrodes 36 and 37 can be fabricated after the upper printed wiring 34 and the printed pads 35 have been formed.

Further, in Embodiments 2, 3, and 5, the fabrication of the element electrodes and the thin films 28, 38, or 68, which include electron emission portions, can be performed following the formation of the printed wiring and printed pads.
(Embodiment 6)

Figure 11A:
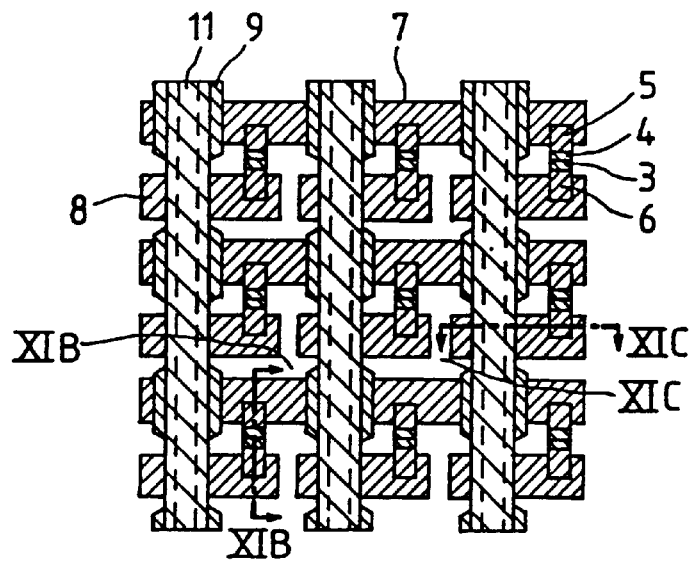
FIGS. 11A through 11C are specific diagrams illustrating yet one more electric wiring example that can be applied to the present invention.
Figure 11B:
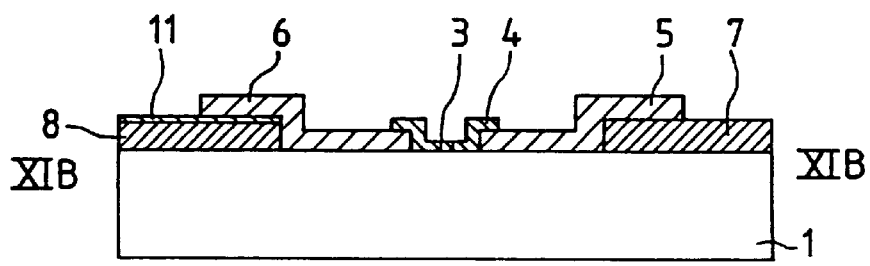
Figure 11C:
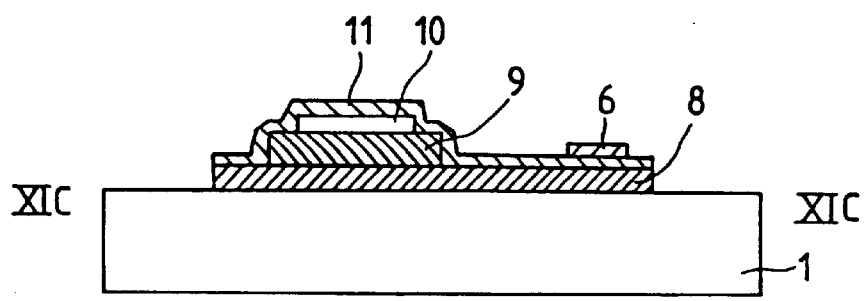

FIG. 11A is a plan view of part of a circuit board that employs a surface conductive emitter that is fabricated in this embodiment. FIG. 11B is a cross sectional view taken along the line XIB—XIB in FIG. 11A, and FIG. 11C is a cross sectional view taken along the line XIC—XIC in FIG. 11A. FIGS. 12A through 12F are diagrams for the procedures for fabricating the circuit board.

In these diagrams, reference number 1 denotes an insulating substrate; 5 and 6, element electrodes that are formed of a Ni thin film; 4, a thin film that includes an electron emission portion of which Pd is a main component; and 3, an electron emission portion. Reference number 7 denotes lower wiring; 8, a connection line; 9, an insulating layer; 10, upper wiring; and 11, plated wiring. The insulating layer 9 is formed so as to be wider at the intersection of the lower wiring 7 and the upper wiring 10 and narrower at the intersection of the connection line 8 and the upper wiring 10. The element electrode is connected to the lower wiring 7, and is electrically insulated from the upper wiring 10 by the insulating layer 9.

In this embodiment, a 40 cm square soda lime glass plate was employed as the insulating substrate 1, and a 350×350 matrix of the electron emitters was provided at an arrangement pitch of 1 mm (in the diagrams only a 3×3 emitter portion is shown).

A method for manufacturing the element substrate will now be described while referring to FIGS. 12A through 12F.

Figure 12A:
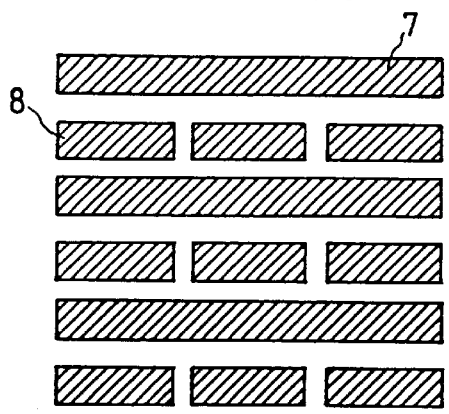
FIGS. 12A through 12F are specific diagrams illustrating yet another electric wiring example that can be applied to the present invention.

1) Screen printing with a silver paste was performed on the washed soda lime glass plate 1, and the resultant substrate was annealed to form the lower wiring 7, which is 300 μm wide and 7 μm thick, and the connection line 8 at the same time (FIG. 12A).

Figure 12B:
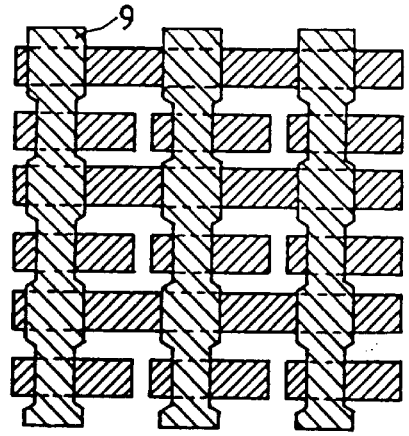

2) Screen printing with glass paste was performed on the structure and the substrate was then annealed to form the insulating layer 9. The width of the insulating layer 9 was set to 600 μm at the intersection with the lower wiring 7 and 300 μm at the intersection with the connection line 8. The thickness of the insulating layer 9 was set to 15 μm (FIG. 12B).

Figure 12C:
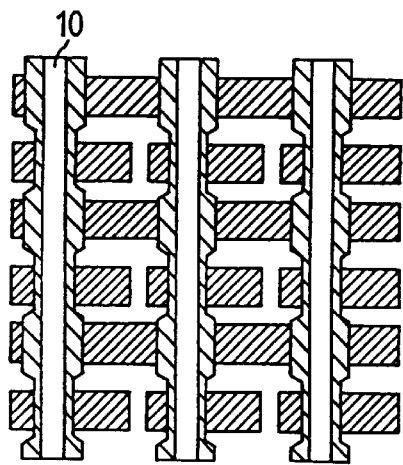

3) Screen printing with silver paste was performed on the insulating layer 9. The resultant structure was then annealed to provide the upper wiring 10, which is 200 μm wide and 10 μm thick (FIG. 12C).

Figure 12D:
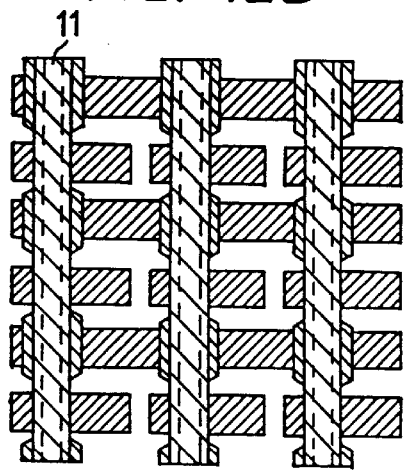

4) The substrate 1 was immersed in a Cu plating bath, the upper wiring 10 was rendered conductive, Cu electrolytic plating to a thickness of 100 μm was performed, and the plated wiring 11 was thus formed (FIG. 12D). A resist mask was employed to cover the portion where plating was not required. The plating bath shown in Table 4 was employed.

TABLE 4

| Pyrophosphoric copper ($CuP_2O_7 \cdot 3H_2O$) | 80 g/l |
| Pyrophosphoric potassium ($K_4P_2O_7$) | 280 g/l |
| Ammonia solution | 2 ml/l |
| Bath temperature | 45° C. |
| Cathode current density | 4 A/dm$^2$ |

The plated wiring 11 also extended down the sides of the upper wiring 10 until it reached the connection line 8, and was also deposited on the connection line 8. The lower wiring 7 and the plated wiring 11 were electrically insulated from each other by the insulating layer 9, and no short-circuit occurred between the upper and lower wiring.

5) A 1000 Å thick Ni thin film was deposited by sputtering while Ti having a thickness of 50 Å was employed as an underlayer. Etching of the Ni and Ti films, by using as a mask a photoresist that was formed in a predetermined shape by photolithography, was performed to provide the element electrodes 5 and 6. The width of the element electrodes 5 and 6 was 300 μm and the distance between them was 3 μm.

Figure 12E:
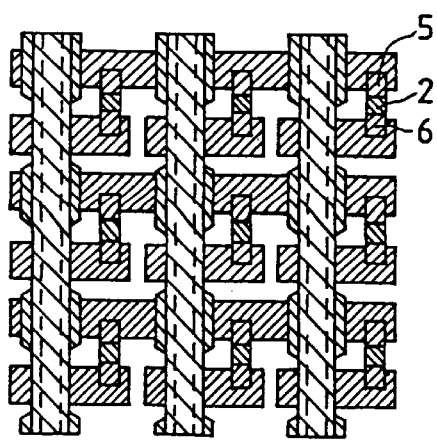

Then, a Cr mask pattern was formed that had an opening in a portion where the thin film 2 for the formation of an electron emission portion was to be deposited. Sputtering was employed to form the Cr film, and etching was used to form the mask pattern. The mask pattern was coated with an organic palladium solution (CCP4230, a product of Okuno Pharmaceutical Co., Ltd.), and was annealed at 300° C. for 20 minutes. Then, by removing the Cr film, the thin film 2, which is a particle film that contains Pd as a primary component, was provided for the forming of an electron emission portion (FIG. 12E).

Figure 12F:
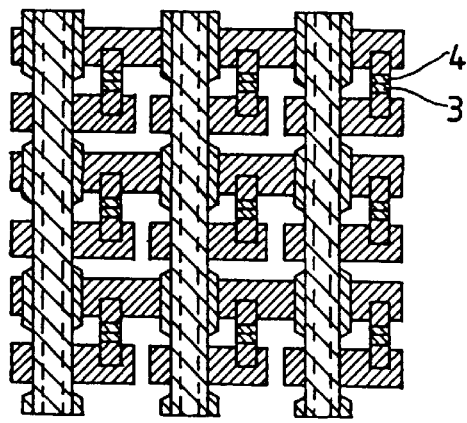

6) Sequentially, a voltage of several V was applied between the element electrodes 5 and 6 by a power source (not shown) in a vacuum, and a forming process was performed to provide the electron emission portions 3 (FIG. 12F). In this embodiment, the forming process was performed after the image display device, which will be described later, was assembled.

In the above described manner, a circuit board was fabricated that had multiple electron emitters formed on the insulating substrate 1.

An image forming apparatus was manufactured using that circuit board. A method for the manufacture of the image display device will now be described while referring to FIG. 4.

The substrate 1 on which the electron emitters 30 were provided was fixed to the rear plate 31. The face plate 36 (where the fluorescent film 34 and the metal back 35 were formed on the internal surface of the glass substrate 33) was positioned 5 mm above the substrate 1 by the support frame 32 and was bonded to the support frame 32.

The fluorescent film 34 was fabricated with RGB stripes by first forming black stripes and then depositing phosphors for individual colors between the black strips.

The metal back 35 is normally provided on the internal surface of the phosphor 34. In this embodiment, after the formation of the phosphor 34, smoothing (commonly called filming) was performed on its internal surface, and the metal back 35 was then fabricated by vacuum evaporation of Al.

Since the positions of the individual phosphors and the electron emitters had to correspond, positioning of them was performed carefully.

Atmosphere in the glass container thus provided was discharged via a discharge pipe (not shown) by a vacuum pump until a sufficient degree of vacuum was obtained within the container. A voltage was applied to the gap between the element electrodes 5 and 6 of the electron emitters via external terminals, Dox1 through Doxm and Doy1 through Doyn, of the container. A conductance process (forming process) was performed for the thin film 2 to form the electron emission portions 3.

To seal the vacuum container, the discharge pipe (not shown) was heated and welded by a gas burner while a vacuum of about $10^{-6}$ torr was maintained within it. Finally, a getter process was performed to maintain the degree of vacuum after the container was sealed. In this process, immediately before the container was to be sealed a getter that was located at a predetermined position (not shown) in the image forming apparatus was heated by a heating process, such as a high frequency heating process, and an evaporation film was formed. The employed getter contained Ba, etc., as prime components.

According to the image display device manufactured by the above described method, the electron emitters emitted electrons upon the application of a voltage of 14 V via the container's external terminals Dox1 through Doxm and Doy1 through Doyn. An electron beam was accelerated by applying a voltage of 3 kV to the metal back 35 via high voltage terminal Hv, so that the phosphor 34 was irradiated by that beam and was excited and rendered fluorescent. The image display was thus enabled.

The wiring resistance of the plated wiring 11 could be reduced to approximately 0.5Ω between both ends of the 40 cm square substrate, i.e., 1/10 or less than the resistance of only the upper wiring 10. Therefore, variances in luminance due to voltage drops, and the deterioration of image quality due to drive signal delays could be prevented.

(Embodiment 7)

Embodiment 7 will now be described while referring to FIGS. 13A through 13C and 14A through 14F.

Figure 13A:
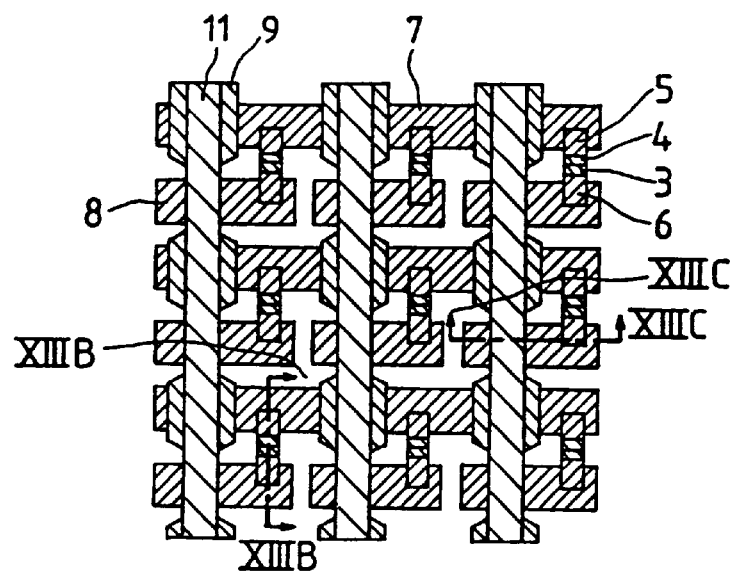
FIGS. 13A through 13C are specific diagrams illustrating a still further electric wiring example that can be applied to the present invention.
Figure 13B:
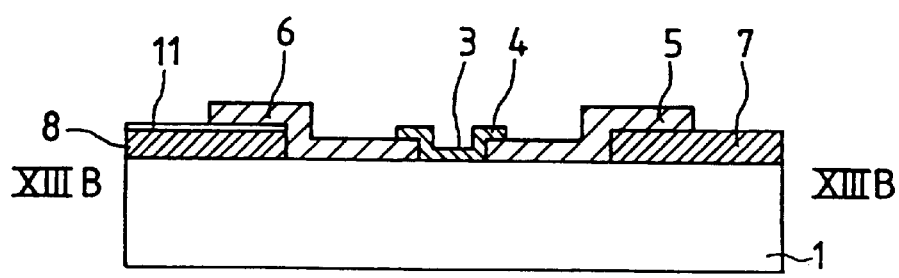
Figure 13C:
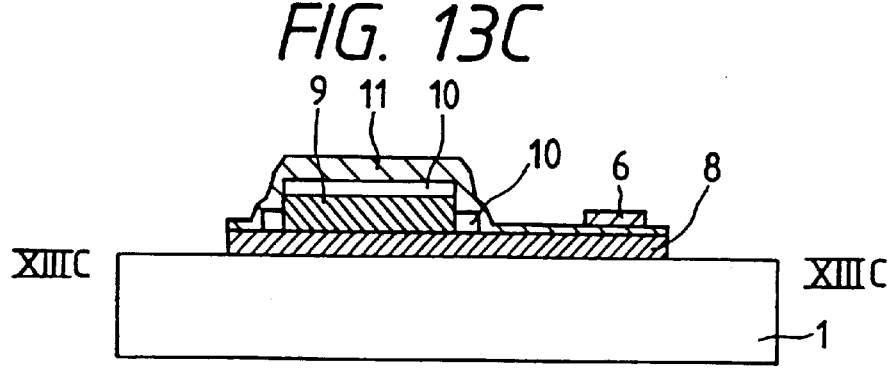

FIG. 13A is a plan view of part of a circuit board that employs a surface conductive emitter that is fabricated in this embodiment. FIG. 13B is a cross sectional view taken along the line XIIIB—XIIIB in FIG. 13A, and FIG. 13C is a cross sectional view taken along the line XIIIC—XIIIC in FIG. 13A. FIGS. 14A through 14F are diagrams for the methods that are used to fabricate the circuit board.

In these diagrams, reference number 1 denotes an insulating substrate; 5 and 6, element electrodes that are formed of a Ni thin film; 4, a thin film that includes an electron emission portion of which Pd is a main component; and 3, an electron emission portion. Reference number 7 denotes lower wiring; 8, a connection line; 9, an insulating layer; 10, upper wiring; and 11, plated wiring. The insulating layer 9 is formed so as to be wider at the intersection of the lower wiring 7 and the upper wiring 10 and narrower at the intersection of the connection line 8 and the upper wiring 10. The element electrode is connected to the lower wiring 7, and is electrically insulated from the upper wiring 10 by the insulating layer 9.

In this embodiment, a 40 cm square soda lime glass plate was employed as the insulating substrate 1, and a 350×350 matrix of the electron emitters was provided at an arrangement pitch of 1 mm (in the diagrams only a 3×3 emitter portion is shown).

A method for manufacturing the element substrate will now be described while referring to FIGS. 14A through 14F.

Figure 14A:
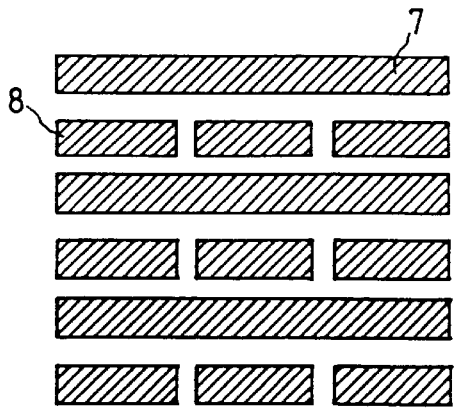
FIGS. 14A through 14F are specific diagrams illustrating yet one further electric wiring example that can be applied to the present invention.

1) Screen printing with silver paste was performed on the washed soda lime glass plate 1, and the resultant substrate was annealed to form the lower wiring 7, which is 300 µm wide and 7 µm thick, and the connection line 8 at the same time (FIG. 14A).

Figure 14B:
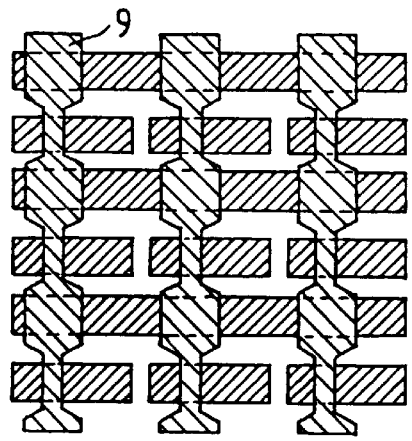

2) Screen printing with glass paste was performed on the structure, and the substrate was then annealed to form the insulating layer 9. The width of the insulating layer 9 was set to 600 µm at the intersection with the lower wiring 7 and 240 µm at the intersection with the connection line 8. The thickness of the insulating layer 9 was set to 20 µm (FIG. 14B).

Figure 14C:
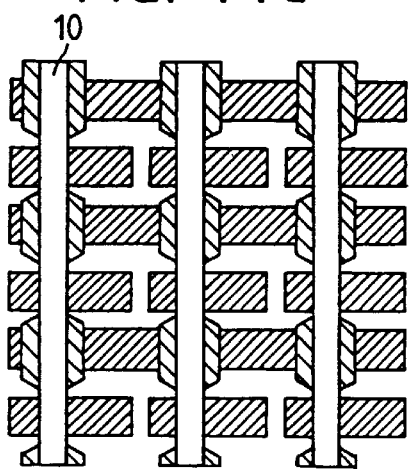

3) Screen printing with silver paste was performed on the insulating layer 9. The resultant structure was then annealed to provide the upper wiring 10, which is 300 µm wide and 10 µm thick (FIG. 14C). In this embodiment, a part of the upper wiring 10 was formed so as to cover part of the side of the insulating layer 9. However, since the upper wiring 10 was not thick enough relative to the thickness of the insulating layer 9, the coverage was insufficient.

Figure 14D:
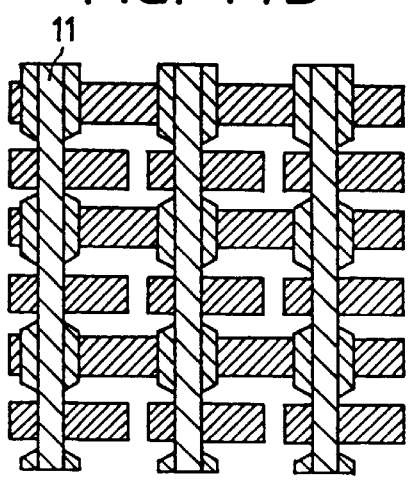

4) A resist mask was arranged on a portion of the substrate 1 where plating was not necessary, and then the substrate 1 was immersed in the Cu plating bath that is shown in Table 1. The upper wiring 10 was rendered conductive and Cu electrolytic plating to a thickness of 80 µm was performed in order to deposit the plated wiring 11 (FIG. 14D). The plated wiring 11 also extended down the sides of the upper wiring 10, which was formed on the insulating layer 9, until it reached the upper wiring 10, which was formed on the connection line 8. The plated wiring 11 was also deposited on the connection line 8 and was connected electrically to the connection line 8. Since the upper wiring 10 was formed on the connection line 8 in this embodiment, electric connection was ensured within a shorter period of time. The lower wiring 7 and the plated wiring 11 were electrically insulated from each other by the insulating layer 9, and no short-circuit occurred between the upper and the lower wiring. 5) A 1000 Å thick Ni thin film was deposited by sputtering while Ti having a thickness of 50 Å was employed as an underlayer. The element electrodes 5 and 6 were formed in the same manner as in Embodiment 6. The width of the element electrodes 5 and 6 was 200 µm and the distance between them was 3 µm.

Figure 14E:
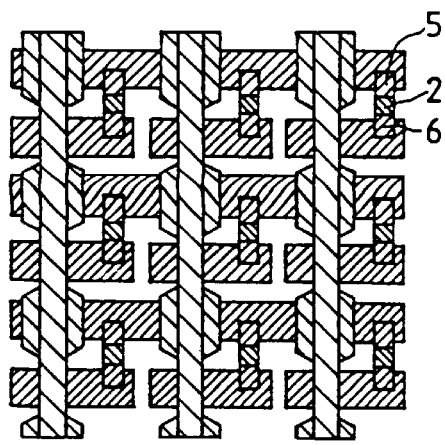

Then, a Cr mask pattern was formed that had an opening in a portion where the thin film 2 for the formation of an electron emission portion was to be deposited. Sputtering was employed to form the Cr film, and etching was used to form the mask pattern. The mask pattern was coated with an organic palladium solution (CCP4230, a product of Okuno Pharmaceutical Co., Ltd.), and was annealed at 300° C. for 20 minutes. Then, by removing the Cr film, the thin film 2, which is a particle film that contains Pd as a primary component, was provided for the forming of an electron emission portion (FIG. 14E).

Figure 14F:
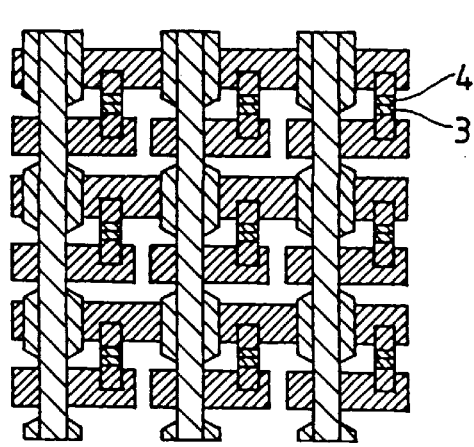
Figure 15:
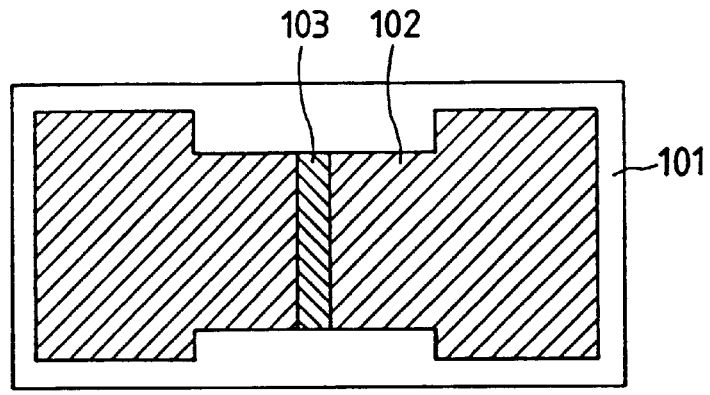
FIG. 15 is a specific diagram illustrating a surface conductive emitter example.

6) Sequentially, the forming process as in Embodiment 6 was performed and the electron emission portion 3 was formed (FIG. 14F).

In the above described manner, a circuit board was fabricated that had multiple electron emitters formed on the insulating substrate 1.

(Embodiment 13)

The method of manufacturing an electron source substrate will be described with reference to FIGS. 17 through 21. First, a pair of element electrodes were formed.

In this embodiment, a soda lime glass substrate was used as a substrate 1, and element electrodes 2 and 3 were formed by the thick film process. An MOD paste was used as a paste in which the metal component was Au. The printing method was thick film screen printing. After printing, the resultant structure was dried at 70° C. for ten minutes, and annealing was performed. The annealing temperature was 550° C., and the peak hold time was about eight minutes. As for the size of each of the element electrodes 2 and 3 after printing and annealing, the width×length with respect to the opposing direction of the element electrodes 2 and 3 was 350×150 µm. The thickness was 0.3 µm or less, and the gap between the element electrodes 2 and 3 was 2 µm.

First wiring (lower wiring) was formed. To form the lower wiring, thick film screen printing was used. An Ag paste was used in which the metal component was Ag. Screen printing was performed to form a desired pattern, and the resultant structure was dried at 110° C. for 20 minutes and annealed at 550° C. for a peak hold time of 15 minutes, thereby obtaining a first wiring layer 6 having a width of 100 µm and a thickness of 12 µm (FIG. 19).

A linear insulating interlayer was formed to be perpendicular to the first wiring, as shown in FIG. 20. The insulating interlayer was formed by the thick film screen printing. A paste mainly consisting of PbO mixed with a glass binder was used as a paste. The annealing temperature was 550° C., and the peak hold time was about 15 minutes. After screen printing and annealing for forming a desired pattern, an insulating interlayer 7 having a width of 500 µm and a thickness of 30 µm or less was obtained. Normally, for the insulating interlayer 7, printing and annealing are performed twice to ensure the insulating properties between the first wiring layer 6 and a second wiring layer 8. More specifically, after the first printing and annealing are performed, printing is performed again. With these processes, the insulating properties can be ensured.

As shown in FIG. 21, the second wiring layer 8 is formed on the insulating interlayer 7. The second wiring layer 8 has a comb-shaped pattern projecting in a direction parallel to the first wiring layer 6 in correspondence with the positions of the element electrodes 2 of the element electrodes 2 and 3 aligned in the X direction. With this arrangement, the second wiring layer 8 is electrically connected to the element electrodes 2. The second wiring layer 8 is preferably thick due to the same reason as for the first wiring layer 6. To form the second wiring layer 8, the same method as for the first wiring layer 6 can be used. In this embodiment, thick film screen printing was used. An Ag paste was used in which the metal component was Ag. After the screen printing for obtaining a desired pattern, the resultant structure was dried at 110° C. for 20 minutes and annealed at 550° C. for a peak hold time of 15 minutes. With these processes, the second wiring layer 8 having a width of 300 µm, a thickness of 10 µm, and a connection pattern with the element electrodes 2 was obtained (FIG. 21).

In this manner, the matrix wiring portion is completed. The paste materials and printing method are not limited to the above-described materials and method, as a matter of course.

Finally, as shown in FIG. 17, the pair of element electrodes 2 and 3 are connected to each other to form a conductive thin film 4 for forming an electron emission portion. Forming of the conductive thin film 4 is performed to form an electron emission portion, thereby completing an electron source. As the method of forming the conductive thin film 4 and the forming process, the conventional processes can be applied without any modification.

More specifically, an organic palladium (CCP4230 available from Okuno Seiyaku Kogyo K.K.) is spin-coated to connect the pair of element electrodes 2 and 3 to each other by using a spinner. Thereafter, annealing is performed at 300° C. for ten minutes, thereby forming the conductive thin film 4 consisting of Pd. The resultant conductive thin film 4 is formed of fine particles mainly consisting of Pd element. The thickness was 10 nm, and the sheet resistance was $5 \times 10^4 \Omega/\square$.

In this embodiment, the projecting comb-shaped pattern of the second wiring layer 8 is in contact with the element electrodes 2 in the entire range in a direction (Y direction) perpendicular to the opposing direction of the element electrodes 2 (FIG. 17). Assume that the second wiring layer 8 is formed of a thick film, and the element electro des 2 are on the positive electrode side. In this case, as shown in FIG. 22, the projecting comb-shaped pattern of a second wiring layer 28 is preferably arranged such that the second wiring layer 28 is brought into contact with element electrodes 22 at end portions in a direction perpendicular to the opposing direction of the element electrodes 22 and 23.

Infection of electrons into the wiring layers must be prevented because electrons emitted from a surface conductive electron emitter 29 have radiation characteristics so that the electrons travel while shifting to the positive electrode side. More specifically, assume that the element electrodes 22 contacting the second wiring layer 28 are positive electrodes. When the second wiring layer 28 formed of a thick film is arranged near a conductive thin film 24, electrons emitted from the electron emission portion do not reach a predetermined position and may be injected into the second wiring layer 28. However, when the second wiring layer 28 is in contact with the element electrodes 22 at the end portions in a direction perpendicular to the opposing direction of the element electrodes 22 and 23, the second wiring layer 28 is not present in the shift direction of the emitted electrons. Therefore, the emitted electrons are prevented from being injected into the second wiring layer 28.

As described above, when the second wiring (upper wiring) is formed to partially overlap the element electrodes, as shown in FIG. 22, a more stable and satisfactory image can be obtained.

In this embodiment, the forming process was performed by continuously applying pulses whose pulse peak value was used as a constant voltage. The applied pulse had a pulse width of 1 ms, a pulse interval of 10 ms, and a peak value of 14 V, and the forming process was performed in a vacuum atmosphere at about $10^{-6}$ Torr for 60 seconds. In the resultant electron emission portion, fine particles mainly consisting of palladium element were dispersed, and the average diameter of the fine particles was 3 nm.

A container was manufactured by the above-described method using the electron source manufactured in the above manner. A drive circuit as shown in FIG. 27 was added to perform TV display, thereby completing an image forming apparatus capable of displaying a TV image. This image forming apparatus has neither thick wiring layer nor insulating interlayer formed by the thick film screen printing, which may affect on the traveling process of electrons. Therefore, a stable and satisfactory image could be obtained under standard driving conditions.

(Embodiment 14)

In this embodiment, an insulating interlayer having a recessed portion at a portion corresponding to a contact between element electrodes was used to form an image forming apparatus.

An electron source in which the same sizes and thicknesses of wiring and an insulating interlayer were formed following the same procedures as in Embodiment 13 was formed. In addition, an image forming apparatus was manufactured following the same procedures as in Embodiment 13 (FIGS. 23 and 24).

In the image forming apparatus manufactured in this embodiment, extension of a paste due to irregular "sagging" during thick film screen printing for forming second wiring (upper wiring) can be regulated by a recessed portion provided to the insulating layer. For this reason, connection to the upper wiring can be properly performed. In addition, since unnecessary electrical connection can be suppressed, short defects can be reduced. Therefore, precise printing becomes unnecessary, and the manufacturing processes can be simplified. Furthermore, since no conductive paste film is present in undesired regions, a stable and satisfactory image can be obtained. Unlike the image forming apparatus of Embodiment 13, the thick wiring is present at a position separated from the electron emission portion. Thus, a more satisfactory image can be stably obtained.

When, as well as in Embodiment 6, an image display device was manufactured by using the above circuit board and was driven, an image could be displayed across the entire screen.

The wiring resistance of the plated wiring 11 could be reduced to approximately $0.5\Omega$ between both ends of the 40 cm square substrate, i.e., $\frac{1}{10}$ or less than the resistance of only the upper wiring 10. Therefore, variances in luminance due to voltage drops, and the deterioration of image quality due to drive signal delays could be prevented.

What is claimed is:

1. A manufacturing method for manufacturing an electron source comprising a plurality of electron emitters comprising steps of:
   (a) preparing a substrate;
   (b) forming on a substrate plural pairs of electrodes, each pair comprising first and second electrodes, wherein said first and second electrodes are spaced by a gap and arranged in opposition to each other;
   (c) forming on said substrate plural first wirings according to a printing method so that said first wirings are arranged substantially in parallel, wherein at least one said first wiring is formed to overlap with a part of at least one said first electrode each of said first wirings comprises some of said first electrodes connected commonly;
   (d) forming plural insulating layers on said first wirings according to the printing method;
   (e) forming plural second wirings so that said second wirings are substantially normal to said first wirings and are electrically insulated from said first wirings, wherein said second wirings are formed substantially in parallel to a direction along which said first and second electrodes are opposed, and each of said second wirings are formed to connect commonly some of said second electrodes;
   (f) forming plural electrically conductive films on said substrate on which said first and second wirings are formed, wherein each of said electrically conductive film is formed to connect said first and second electrodes; and
   (g) forming an electron emission portion at each of said plural electrically conductive film, by applying a voltage to each of said pair of electrodes.

2. A manufacturing method according to claim 1, wherein said second wiring is formed to overlap with a part of said second electrode.

3. A manufacturing method according to claim 1, wherein said first and second electrodes are formed by painting and baking a paste comprising a metal organic compound.

4. A manufacturing method according to claim 1, wherein said first wiring is formed by a screen printing method.

5. A manufacturing method according to claim 4, wherein said first wiring is formed by painting and baking Ag paste using said screen printing method.

6. A manufacturing method according to claim 1, wherein said insulating layer is formed by a screen printing method.

7. A manufacturing method according to claim 1, wherein said second wiring is formed by a screen printing method.

8. A manufacturing method according to claim 7, wherein said second wiring is formed by painting and baking Ag paste using said screen printing.

9. A method of manufacturing an image-forming apparatus comprising a substrate on which a phosphor is arranged, and a substrate on which an electron source is arranged, wherein said electron source is manufactured according to a method of claim 1.

10. A manufacturing method for manufacturing an electron source comprising a plurality of electron emitters comprising steps of:
   (a) preparing a substrate;
   (b) forming on a substrate plural pairs of electrodes, each pair comprising first and second electrodes, wherein said first and second electrodes are spaced by a gap and arranged in opposition to each other;
   (c) forming on said substrate plural first wirings according to a printing method so that said first wirings are arranged substantially in parallel, wherein each of said first wirings comprises some of said first electrodes connected commonly;
   (d) forming plural insulating layers on said first wirings according to the printing method;
   (e) forming plural second wirings so that said second wirings are substantially normal to said first wirings and are electrically insulated from said first wirings, wherein said second wirings are formed substantially in parallel to a direction along which said first and second electrodes are opposed, and each of said second wirings are formed to connect commonly some of said second electrodes and at least one said second wiring is formed to overlap with a part of at least one said second electrode;
   (f) forming plural electrically conductive films on said substrate on which said first and second wirings are formed, wherein each of said electrically conductive film is formed to connect said first and second electrodes; and
   (g) forming an electron emission portion at each of said plural electrically conductive film, by applying a voltage to each of said pair of electrodes.

11. A manufacturing method for manufacturing an electron source comprising a plurality of electron emitters comprising steps of:
   (a) preparing a substrate;
   (b) forming on a substrate plural pairs of electrodes by painting and baking a paste comprising a metal organic compound, each pair comprising first and second electrodes, wherein said first and second electrodes are spaced by a gap and arranged in opposition to each other;
   (c) forming on said substrate plural first wirings according to a printing method so that said first wirings are arranged substantially in parallel, wherein each of said first wirings comprises some of said first electrodes connected commonly;
   (d) forming plural insulating layers on said first wirings according to the printing method;
   (e) forming plural second wirings so that said second wirings are substantially normal to said first wirings and are electrically insulated from said first wirings, wherein said second wirings are formed substantially in parallel to a direction along which said first and second electrodes are opposed, and each of said second wirings are formed to connect commonly some of said second electrodes;
   (f) forming plural electrically conductive films on said substrate on which said first and second wirings are formed, wherein each of said electrically conductive film is formed to connect said first and second electrodes; and
   (g) forming an electron emission portion at each of said plural electrically conductive film, by applying a voltage to each of said pair of electrodes.

* * * * *

UNITED STATES PATENT AND TRADEMARK OFFICE
CERTIFICATE OF CORRECTION

PATENT NO.    : 6,283,813 B1
DATED         : September 4, 2001
INVENTOR(S)   : Tetsuya Kaneko et al.

It is certified that error appears in the above-identified patent and that said Letters Patent is hereby corrected as shown below:

Title page,
Item [56] References Cited, FOREIGN PATENT DOCUMENTS, "605881 * 7/1994 (EP)." should be deleted (duplication).

Column 2,
Line 52, "a" should be deleted.

Column 5,
Line 33, "not" should read -- so as not --; and
Line 57, "FIGS.." should read -- FIGS. --.

Column 16,
Line 46, "by a" should read -- by one --; and
Line 60, "diving" should read -- driving --.

Column 27,
Line 45, "5) A" should read -- ¶ 5) A --.

Column 29,
Line 18, "electro des" should read -- electrodes --; and
Line 62, "on" should be deleted.

Column 30,
Line 46, "each" should read -- and each --;
Line 62, "film" should read -- films --; and
Line 66, "film," should read -- films, --.

UNITED STATES PATENT AND TRADEMARK OFFICE
CERTIFICATE OF CORRECTION

PATENT NO. : 6,283,813 B1
DATED : September 4, 2001
INVENTOR(S) : Tetsuya Kaneko et al.

It is certified that error appears in the above-identified patent and that said Letters Patent is hereby corrected as shown below:

<u>Column 32,</u>
Line 4, "film" should read -- films --;
Line 7, "film" should read -- films, --;
Line 40, "film" should read -- films --; and
Line 43, "film," should read -- films, --.

Signed and Sealed this

Twenty-sixth Day of February, 2002

Attest:

JAMES E. ROGAN
*Attesting Officer*     *Director of the United States Patent and Trademark Office*